United States Patent
Ogawa et al.

(10) Patent No.: US 10,046,752 B2
(45) Date of Patent: Aug. 14, 2018

(54) CONTROL DEVICE FOR HYBRID VEHICLE

(71) Applicant: TOYOTA JIDOSHA KABUSHIKI KAISHA, Toyota-shi, Aichi (JP)

(72) Inventors: Yuki Ogawa, Toyota (JP); Keisuke Morisaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/584,616

(22) Filed: May 2, 2017

(65) Prior Publication Data

US 2017/0355358 A1    Dec. 14, 2017

(30) Foreign Application Priority Data

Jun. 9, 2016 (JP) .................. 2016-114980

(51) Int. Cl.
| | |
|---|---|
| *B60W 10/26* | (2006.01) |
| *B60L 11/14* | (2006.01) |
| *B60W 10/00* | (2006.01) |
| *B60W 10/28* | (2006.01) |
| *B60K 6/445* | (2007.10) |
| *B60W 10/06* | (2006.01) |
| *B60W 10/08* | (2006.01) |
| *B60W 30/18* | (2012.01) |

(Continued)

(52) U.S. Cl.
CPC ............ *B60W 10/26* (2013.01); *B60K 6/445* (2013.01); *B60L 11/14* (2013.01); *B60W 10/00* (2013.01); *B60W 10/06* (2013.01); *B60W 10/08* (2013.01); *B60W 10/28* (2013.01); *B60W 20/12* (2016.01); *B60W 20/14* (2016.01); *B60W 30/18127* (2013.01)

(58) Field of Classification Search
None
See application file for complete search history.

(56) References Cited

U.S. PATENT DOCUMENTS

| | | | |
|---|---|---|---|
| 6,856,866 B2 * | 2/2005 | Nakao ............... | B60L 11/1851 180/65.1 |
| 8,825,243 B2 * | 9/2014 | Yang ................. | B60W 20/11 180/65.29 |

(Continued)

FOREIGN PATENT DOCUMENTS

JP    2014-015125 A    1/2014

*Primary Examiner* — Dirk Wright
(74) *Attorney, Agent, or Firm* — Oliff PLC

(57) ABSTRACT

A control device for a hybrid vehicle carries out, when a vehicle travels in a downhill control section or a congestion control section, pre-charge/discharge control of changing a target state of charge (SOC) SOCcntr from a standard SOC SOCcntr-n to a specific SOC, and is within a permissible range, in a period in which the vehicle travels from a control start point (Ds) to at least a start point (Dk) of a subject downhill section or a subject congested section. Further, the control device is configured to inhibit, when return control is carried out while the pre-charge/discharge control is being carried out, the pre-charge/discharge control from a start time point (D5) of the return control to a time point (D9) at which the vehicle has passed through the control section. As a result, fuel efficiency can be improved when the return control is carried out during the pre-charge/discharge control.

4 Claims, 12 Drawing Sheets

(51) Int. Cl.
  *B60W 20/12* (2016.01)
  *B60W 20/14* (2016.01)

(56) References Cited

U.S. PATENT DOCUMENTS

| | | | |
|---|---|---|---|
| 8,903,578 B2* | 12/2014 | Yamazaki | B60W 20/00 |
| | | | 701/22 |
| 9,605,606 B2* | 3/2017 | Dufford | F02D 29/02 |
| 9,616,757 B2* | 4/2017 | Lee | B60L 15/2009 |
| 9,702,718 B2* | 7/2017 | Payne | G01C 21/3469 |
| 2011/0066308 A1 | 3/2011 | Yang et al. | |
| 2015/0032317 A1* | 1/2015 | Kato | B60W 10/08 |
| | | | 701/22 |
| 2015/0336458 A1 | 11/2015 | Lee et al. | |
| 2017/0021821 A1* | 1/2017 | Ogawa | B60W 10/06 |
| 2017/0021823 A1* | 1/2017 | Ogawa | B60W 20/12 |
| 2017/0088117 A1* | 3/2017 | Ogawa | B60W 10/08 |
| 2017/0144650 A1* | 5/2017 | Nagamiya | B60W 20/12 |

* cited by examiner

CONTROL DEVICE FOR HYBRID VEHICLE

BACKGROUND OF THE INVENTION

1. Field of the Invention

The present invention relates to a control device for a hybrid vehicle, which is configured to increase or decrease, in advance, a state of charge of a storage battery installed in the hybrid vehicle before the hybrid vehicle enters a downhill section or a congested section in which the hybrid vehicle is to subsequently travel.

2. Description of the Related Art

It is known that performance degradation of a storage battery of a hybrid vehicle (hereinafter also simply referred to as "vehicle") is accelerated when a change in state of charge (hereinafter also simply referred to as "SOC") of the storage battery repeatedly occurs under a state where the state of charge is extremely high or extremely low. Thus, hitherto, the SOC of the storage battery is managed in order to prevent the storage battery from degrading. Specifically, an upper limit and a lower limit of the SOC are defined, and a control device manages the SOC so that the SOC does not deviate from a range (hereinafter referred to as "management range") between the upper limit and the lower limit.

In other words, when the SOC becomes more than the upper limit thereof, the control device carries out control of inhibiting the charge of the storage battery and simultaneously stopping the operation of an internal combustion engine to carry out electric travel through use of power stored in the storage battery, thereby discharging the storage battery. This control is hereinafter also referred to as "forced discharge". On this occasion, the control device cannot recover electric energy generated by regenerative braking. In contrast, when the SOC becomes less than the lower limit thereof, the control device carries out control of forcefully operating the internal combustion engine and charging the storage battery through use of output thereof. This control is hereinafter also referred to as "forced charge". As a result, fuel is greatly consumed for a reason other than the vehicle travel. Thus, bringing the SOC within the management range during the travel of the vehicle is effective for increasing fuel efficiency of the vehicle.

For example, when the vehicle travels on such a downhill that the vehicle accelerates without using torques (driving forces) generated by the internal combustion engine and a motor generator, a vehicle braking force is required by a driver releasing his or her foot from an accelerator pedal and further depressing a brake pedal depending on necessity. On this occasion, an increase in vehicle speed is suppressed by the regenerative braking force of the motor generator, and the power generated by the regenerative braking is supplied to the storage battery. As a result, the SOC of the storage battery increases. Therefore, when the vehicle travels on a long downhill (section relatively long in distance, and relatively high in elevation difference), the SOC may become more than the upper limit thereof in the course of the downhill. In this case, the control device carries out the "forced discharge" in order to decrease the SOC.

In contrast, when the vehicle travels on a congested road, the driving force of the motor generator is used for the travel of the vehicle, and the generation of the power by the regenerative braking can hardly be expected. Therefore, the power stored in the storage battery is consumed, and the SOC of the storage battery thus decreases. Therefore, when the vehicle travels on a long congested road, the SOC may become less than the lower limit thereof during this travel. In this case, the control device carries out the "forced charge" in order to increase the SOC.

Thus, one of related-art control devices for a hybrid vehicle (hereinafter referred to as "related-art device") is configured to use an infrastructure information acquisition device (navigation system) to acquire the position of the vehicle, road information, and other information, and to extract a planned travel route and congested sections existing on the planned travel route based on the acquired information. The related-art device is configured to further carry out charge control of increasing the SOC of the storage battery in advance before the vehicle enters the extracted congested section (for example, refer to Japanese Patent Application Laid-open No. 2014-15125).

More specifically, the related-art device is configured to carry out "congestion control" of increasing a target SOC of the storage battery in advance to a predetermined SOC more than the target SOC (standard SOC) for normal travel in a section from a point a predetermined distance before a start point of the congested section to the start point of the congested section. The above-mentioned section is also referred to as "pre-charge section".

However, when an unexpected downhill exists in the pre-charge section, and the vehicle travels in the pre-charge section, the SOC may increase more than an initial (before the vehicle enters the pre-charge section) expectation to become more than the upper limit of the SOC. In this case, the above-mentioned "forced discharge" of the storage battery is carried out, and the "congestion control", which is carried out until this point, is temporarily stopped.

In this case, the "forced discharge" decreases the SOC of the storage battery by a predetermined amount from the upper limit thereof, and is then finished. Subsequently, the related-art device resumes the "congestion control", and attempts to cause the SOC of the storage battery to approach the target SOC for the "congestion control". However, when the vehicle subsequently travels on a downhill during the "congestion control", the SOC may increase to become more than the upper limit of the SOC, and the "forced discharge" may be carried out again. A plurality of times of execution of the forced discharge in this way may not only induce degradation of the fuel efficiency, but also cause the driver to feel a sense of discomfort due to repetition of the start and stop of the engine.

Meanwhile, the device may carry out "downhill control" of decreasing the target SOC of the storage battery in advance to a predetermined SOC smaller than the target SOC (standard SOC) for normal travel in a section from a point a predetermined distance before a start point of the downhill section to the start point of the downhill section. The above-mentioned section is also referred to as "pre-use section".

However, when the vehicle is stuck in an unexpected congestion during the travel in the pre-use section, the SOC may decrease below an initial expectation to become less than the lower limit of the SOC. In this case, the above-mentioned "forced charge" of the storage battery is carried out, and the "downhill control", which is carried out until this point, is temporarily stopped.

In this case, the "forced charge" increases the SOC of the storage battery by a predetermined amount from the lower limit thereof, and is then finished. Subsequently, the device resumes the "downhill control", and attempts to cause the SOC of the storage battery to approach the target SOC for the "downhill control". However, when the vehicle subsequently travels on a congested road during the "downhill control", the SOC may decrease to become less than the lower limit of the SOC, and the "forced charge" may be carried out again. A plurality of times of execution of the forced charge in this way may not only induce the degradation of the fuel efficiency, but also cause the driver to feel a sense of discomfort due to the repetition of the start and stop of the engine.

SUMMARY OF THE INVENTION

The present invention has been made in view of the above-mentioned problem. Specifically, it is an object of the present invention to provide a control device for a hybrid vehicle, which is capable of avoiding repetition of forced charge during downhill control, and avoiding repetition of forced discharge during congestion control, thereby increasing fuel efficiency.

According to one embodiment of the present invention, there is provided a control device for a hybrid vehicle (hereinafter also referred to as "device according to the present invention"), which is applied to a hybrid vehicle (10) in which an internal combustion engine (20) serving as a drive source for the hybrid vehicle (10), a motor generator (MG1, MG2) serving as a drive source for the hybrid vehicle, and a storage battery (64) configured to supply power to the motor generator are installed, the hybrid vehicle being configured to carry out regenerative braking through use of the motor generator, and to be capable of charging the storage battery with power generated by the regenerative braking and capable of charging the storage battery with power generated by output of the internal combustion engine through use of the motor generator.

Further, the device according to the present invention includes a control part (70 to 74, see a flowchart of FIG. 10) configured to control the internal combustion engine and the motor generator so that a state of charge (SOC) of the storage battery satisfies a required driving force (required torque) required for the hybrid vehicle and approaches a target state of charge (SOC cntr) set to a standard state of charge (SOC cntr-n).

The control part is configured to:

(1) carry out, when the state of charge deviates from a permissible range (management range: MGR) of from a lower limit state of charge (SOClolmt) less than the standard state of charge to an upper limit state of charge (SOCuplmt) more than the standard state of charge ("YES" in Step 510, "YES" in Step 710), return control of forcefully carrying out one of charge of the storage battery and discharge from the storage battery so that the state of charge returns to within the permissible range (Step 1040 to Step 1092);

(2) acquire position information representing a position of the hybrid vehicle and road information (Step 815, Step 915);

(3) acquire a planned travel route of the hybrid vehicle based on the position information and the road information (Step 815, Step 915);

(4) extract a subject section within the planned travel route, which is at least one of a subject downhill section satisfying a first predetermined condition, a subject congested section satisfying a second predetermined condition, or a subject uphill section satisfying a third predetermined condition route, based on road information on a road section forming the planned travel route, which is the road information (Step 815, Step 915); and (5) determine, when the subject section is included in the planned travel route, a control section, which is a section from a control start point (Ds) a predetermined distance before a start point (Dk, Dj) of the subject section to an end point (De) of the subject section (Step 815, Step 915).

The control part is further configured to:

carry out, when the hybrid vehicle travels in the control section, pre-charge/discharge control of changing the target state of charge from the standard state of charge to a specific state of charge (SOCcntr-d, SOCcntr-j, SOCcntr-u), which is different from the standard state of charge and is within the permissible range, in a period in which the hybrid vehicle travels from the control start point to at least the start point of the subject section (Step 825, Step 925); and inhibit, when the return control is carried out while the pre-charge/discharge control is being carried out ("Yes" in Step 840, "Yes" in Step 940), the pre-charge/discharge control from a start point (D5) of the return control to a time point (D9) at which the hybrid vehicle has passed through the control section (Step 855, Step 875, Step 955, Step 975).

As described above, the device according to the present invention does not carry out the pre-charge/discharge control in the control section even after the "return control" is started during the pre-charge/discharge control, and then the "return control" is finished. Thus, with the device according to the present invention, the return control is not repeated after the return control is started during the pre-charge/discharge control, and the occurrence of the wasteful operation of the internal combustion engine can be reduced. In other words, with the device according to the present invention, the fuel efficiency can be increased compared with the related-art device.

In the control device for a hybrid vehicle according to one aspect of the present invention, the control part is configured to: extract the subject downhill section as the subject section; and set the specific state of charge to a first state of charge (SOCcntr-d) less than the standard state of charge and more than the lower limit state of charge.

According to this aspect, the device according to the present invention can extract only the downhill section as the subject section. In other words, even when the state of charge SOC becomes less than the lower limit state of charge while only the downhill control is being carried out, the occurrence of the wasteful operation of the internal combustion engine can be decreased by inhibiting the downhill control from being carried out after the forced charge.

In the control device for a hybrid vehicle according to one aspect of the present invention, the control part is configured to: extract the subject congested section as the subject section; and set the specific state of charge to a second state of charge (SOCcntr-j) more than the standard state of charge and less than the upper limit state of charge.

According to this aspect, the device according to the present invention can extract only the congested section as the subject section. In other words, even when the state of charge SOC becomes more than the upper limit state of charge while only the congestion control is being carried out, the occurrence of the wasteful operation of the internal combustion engine can be decreased by inhibiting the congestion control from being carried out after the forced discharge.

In the control device for a hybrid vehicle according to one aspect of the present invention, the control part is configured to: extract the subject uphill section as the subject section; and set the specific state of charge to a third state of charge (SOCcntr-u) more than the standard state of charge and less than the upper limit state of charge.

According to this aspect, the device according to the present invention can extract only the uphill section as the subject section. In other words, even when the state of charge SOC becomes more than the upper limit state of charge while only the uphill control is being carried out, the occurrence of the wasteful operation of the internal combustion engine can be decreased by inhibiting the uphill control from being carried out after the forced discharge.

In the description given above, in order to facilitate understanding of the present invention, names and/or reference symbols used in an embodiment of the present invention described later are enclosed in parentheses, and are assigned to components of the invention corresponding to the embodiment. However, the respective components of the present invention are not limited to the embodiment defined by the reference symbols. Other objects, other features, and accompanying advantages of the present invention are readily understood from a description of the embodiment of the present invention to be given referring to the following drawings.

DESCRIPTION OF THE EMBODIMENTS

A description is now given of a "control device for a hybrid vehicle" (hereinafter referred to as "the control device") according to an embodiment of the present invention with reference to the drawings.

(Configuration)

Figure 1:
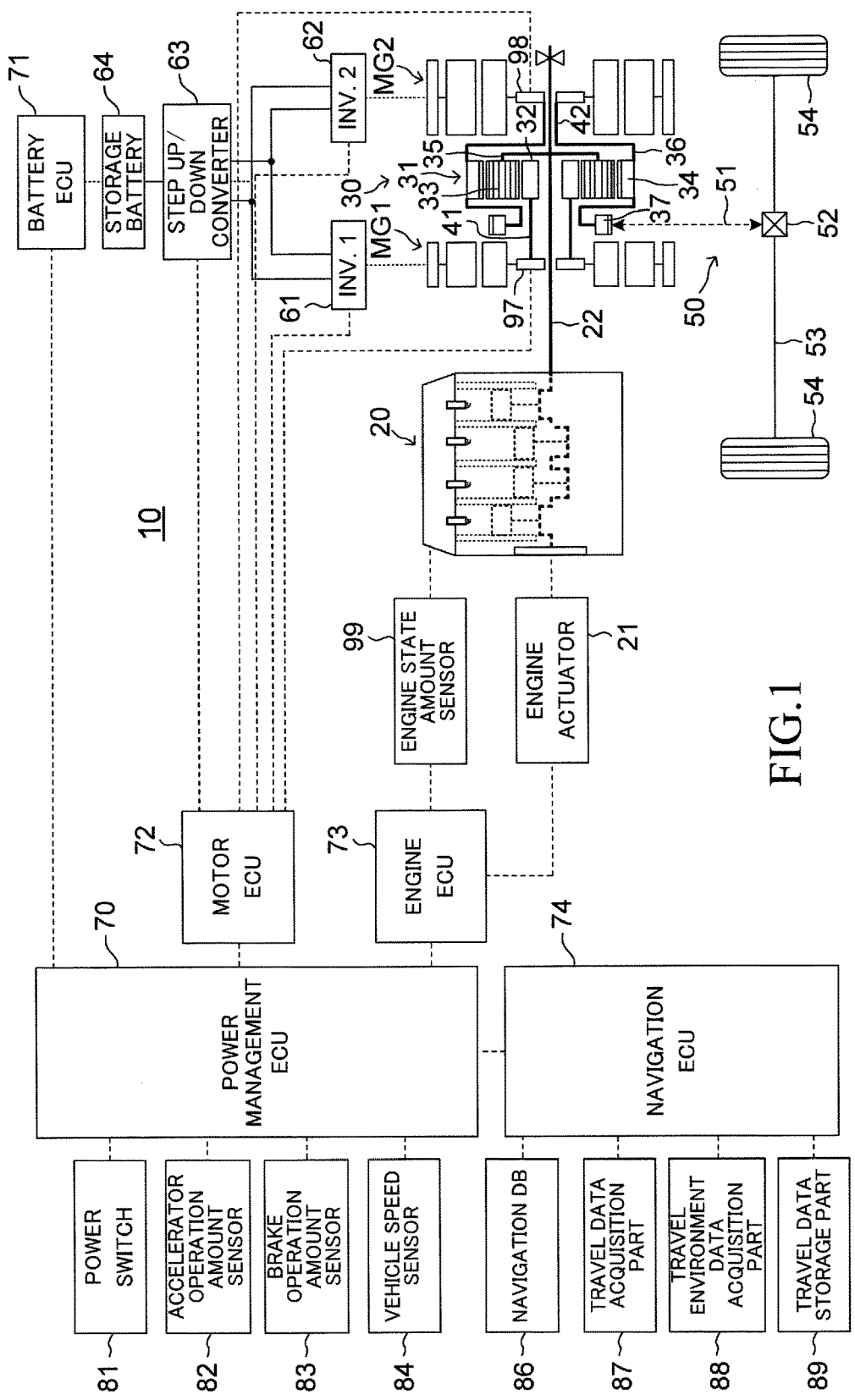
FIG. 1 is a schematic diagram for illustrating a hybrid vehicle to which a control device for a hybrid vehicle according to an embodiment of the present invention is applied and the control device.

The control device is applied to a hybrid vehicle 10 (hereinafter also simply referred to as "vehicle") illustrated in FIG. 1.

The vehicle 10 includes a first motor generator MG1, a second motor generator MG2, an internal combustion engine 20, a power distribution mechanism 30, a driving force transmission mechanism 50, a first inverter 61, a second inverter 62, a step up/down converter 63, a storage battery 64, a power management ECU 70, a battery ECU 71, a motor ECU 72, an engine ECU 73, and a navigation ECU 74. Those ECUs correspond to a control part of the present invention. Two or more of those ECUs may be unified to be one ECU.

The ECU is an abbreviated word for an electric control unit, and is an electronic control circuit including, as a main component, a microcomputer including a CPU, a ROM, a RAM, a backup RAM (or nonvolatile memory), and an interface. The CPU is configured to execute instructions (routines) stored in the memory (ROM) to implement various functions described later.

The first motor generator MG1 is a synchronous motor generator capable of functioning as any of a generator and a motor. The first motor generator MG1 provides a function mainly as a generator in this example. The first motor generator MG1 includes a first shaft 41, which is an output shaft.

The second motor generator MG2 is a synchronous motor generator capable of functioning as any of a generator and a motor, similarly to the first motor generator MG1. The second motor generator MG2 provides a function mainly as a motor in this example. The second motor generator MG2 includes a second shaft 42, which is an output shaft.

The internal combustion engine (hereinafter also simply referred to as "engine") 20 is a four-cycle, spark ignition, and multi-cylinder internal combustion engine. The engine 20 includes a widely-known engine actuator 21. For example, the engine actuator 21 includes a fuel supply device including fuel injection valves, an ignition device including ignition plugs, a throttle opening degree change actuator, and a variable valve timing (VVT) control device. The engine 20 is configured to be able to change a torque and an engine RPM (that is, engine output) generated by the engine 20 by using a throttle valve actuator to change an opening degree of a throttle valve arranged in an intake passage (not shown), thereby changing an intake air amount, and changing a fuel injection amount depending on the intake air amount, for example. The engine 20 generates a torque on a crankshaft 22, which is an output shaft of the engine 20.

The power distribution mechanism 30 includes a widely-known planetary gear device 31. The planetary gear device 31 includes a sun gear 32, a plurality of planetary gears 33, and a ring gear 34.

The sun gear 32 is connected to the first shaft 41 of the first motor generator MG1. Thus, the first motor generator MG1 can output a torque to the sun gear 32. The first motor generator MG1 can be rotationally driven by a torque input from the sun gear 32 to the first motor generator MG1, thereby generating electricity.

The plurality of planetary gears 33 each mesh with the sun gear 32, and simultaneously mesh with the ring gear 34. A rotational shaft (shaft of rotation) of the planetary gear 33 is provided on a planetary carrier 35. The planetary carrier 35 is held so as to rotate coaxially with the sun gear 32. The planetary carrier 35 is connected to the crankshaft 22 of the engine 20.

The ring gear 34 is held so as to rotate coaxially with the sun gear 32.

When a torque is input from the planetary gears 33 to the sun gear 32, the sun gear 32 is rotationally driven by this torque. When a torque is input from the planetary gears 33 to the ring gear 34, the ring gear 34 is rotationally driven by this torque. Conversely, when a torque is input from the sun gear 32 to the planetary gears 33, the planetary gears 33 are rotationally driven by this torque. When a torque is input from the ring gear 34 to the planetary gears 33, the planetary gears 33 are rotationally driven by this torque.

The ring gear 34 is connected to the second shaft 42 of the second motor generator MG2 via a ring gear carrier 36. Thus, the second motor generator MG2 can output a torque to the ring gear 34. The second motor generator MG2 can be rotationally driven by a torque input from the ring gear 34 to the second motor generator MG2, thereby generating electricity.

Further, the ring gear 34 is connected to an output gear 37 via the ring gear carrier 36. Thus, the output gear 37 can be rotationally driven by the torque input from the ring gear 34 to the output gear 37. The ring gear 34 can be rotationally driven by a torque input from the output gear 37 to the ring gear 34.

The driving force transmission mechanism 50 includes a gear train 51, a differential gear 52, and a drive shaft 53.

The gear train 51 connects the output gear 37 and the differential gear 52 to each other so as to be able to transmit the power via a gear mechanism. The differential gear 52 is mounted to the drive shaft 53. Drive wheels 54 are mounted to both ends of the drive shaft 53. Thus, the torque from the output gear 37 is transmitted to the drive wheels 54 via the gear train 51, the differential gear 52, and the drive shaft 53. The hybrid vehicle 10 can use the torques transmitted to the drive wheels 54 to travel.

The first inverter 61 is electrically connected to the first motor generator MG1 and the step up/down converter 63. The step up/down converter 63 is further electrically connected to the storage battery 64. Thus, when the first motor generator MG1 is generating power, the power generated by the first motor generator MG1 is supplied to the storage battery 64 via the first inverter 61 and the step up/down converter 63. Conversely, the first motor generator MG1 is rotationally driven by power supplied from the storage battery 64 via the step up/down converter 63 and the first inverter 61.

The second inverter 62 is electrically connected to the second motor generator MG2 and the step up/down converter 63. Thus, the second motor generator MG2 is rotationally driven by power supplied from the storage battery 64 via the step up/down converter 63 and the second inverter 62. Conversely, when the second motor generator MG2 is generating power, the power generated by the second motor generator MG2 is supplied to the storage battery 64 via the second inverter 62 and the step up/down converter 63.

The power generated by the first motor generator MG1 can be directly supplied to the second motor generator MG2, and the power generated by the second motor generator MG2 can be directly supplied to the first motor generator MG1.

The storage battery 64 is electricity storage means for storing the electric energy for driving the first motor generator MG1 and the second motor generator MG2, and is constructed by a rechargeable battery, e.g., a lithium ion battery, which is capable of repeating the charge and the discharge. An SOC sensor (not shown) used to detect the SOC is mounted to the storage battery 64, thereby enabling the battery ECU 71 to monitor the SOC of the storage battery 64.

The storage battery 64 only needs to be an electricity storage device capable of charging and discharging, and may be not only the lithium ion battery, but also another rechargeable battery, e.g., a nickel hydrogen battery, a lead battery, or a nickel cadmium battery.

The power management ECU 70 (hereinafter also referred to as "PMECU 70") is connected to the battery ECU 71, the motor ECU 72, the engine ECU 73, and the navigation ECU 74 to be described later so as to be capable of exchanging information via controller area network (CAN) communication.

The PMECU 70 is configured to receive output signals from a power switch 81, which is a system activation switch of the hybrid vehicle 10, an accelerator operation amount sensor 82, a brake operation amount sensor 83, a vehicle speed sensor 84, and the like.

The accelerator operation amount sensor 82 is configured to generate an output signal representing an operation amount (hereinafter referred to as "accelerator operation amount AP") of an accelerator pedal (not shown) provided so as to be operated by a driver. The accelerator operation amount AP can also be expressed as an acceleration operation amount.

The brake operation amount sensor 83 is configured to generate an output signal representing an operation amount (hereinafter referred to as "brake operation amount BP") of a brake pedal (not shown) provided so as to be operated by the driver.

The vehicle speed sensor 84 is configured to generate an output signal representing a vehicle speed SPD of the hybrid vehicle 10.

The PMECU 70 is configured to input the state of charge SOC of the storage battery 64 acquired by the battery ECU 71. The state of charge SOC is calculated by a widely known method based on an integrated value of a current flowing into/out from the storage battery 64, and the like.

The PMECU 70 is configured to input a signal representing an RPM of the first motor generator MG1 and a signal representing an RPM of the second motor generator MG2 via the motor ECU 72. The signal representing the RPM of the first motor generator MG1 is referred to as "MG1 RPM Nm1". The signal representing the RPM of the second motor generator MG2 is referred to as "MG2 RPM Nm2".

The MG1 RPM Nm1 is calculated by the motor ECU 72 based on an "output value of a resolver 97 provided in the first motor generator MG1 and configured to output an output value corresponding to a rotational angle of a rotor of the first motor generator MG1". Similarly, the MG2 RPM Nm2 is calculated by the motor ECU 72 based on an "output value of a resolver 98 provided in the second motor generator MG2 and configured to output an output value corresponding to a rotational angle of a rotor of the second motor generator MG2".

The PMECU 70 is configured to input output signals representing an engine state detected by an engine state amount sensor 99 via the engine ECU 73. The output signals representing the engine state include an engine RPM NE, a throttle opening degree TA, and a coolant temperature THW of the engine.

Further, the PMECU 70 determines a required braking force based on the accelerator operation amount AP and the brake operation amount BP. Further, the PMECU 70 distributes the required braking force to a required regenerative braking force and a required friction braking force. The PMECU 70 outputs a command to the motor ECU 72 so that the required regenerative braking force is generated. Further, the PMECU 70 outputs a command for generating the required friction braking force to a brake ECU for controlling a brake actuator (not shown). The brake ECU controls the brake actuator to generate a friction braking force equal to the required friction braking force.

The motor ECU 72 is connected to the first inverter 61, the second inverter 62, and the step up/down converter 63. The motor ECU 72 is configured to transmit command signals to the first inverter 61, the second inverter 62, and the step up/down converter 63 based on commands (e.g., "MG1 command torque Tm1* and MG2 command torque Tm2*") from the PMECU 70. As a result, the motor ECU 72 uses the first inverter 61 and the step up/down converter 63 to control the first motor generator MG1, and uses the second inverter 62 and the step up/down converter 63 to control the second motor generator MG2.

The engine ECU 73 is configured to transmit an instruction signal to the engine actuator 21 based on the command from the PMECU 70 and the signal from the engine state amount sensor 99, thereby controlling the engine 20.

The navigation ECU (hereinafter also referred to as "NVECU") 74 is electrically connected to a navigation database 86, a travel data acquisition part 87, a travel environment data acquisition part 88, a travel data storage part 89, and the like.

The navigation database (hereinafter also referred to as "NVDB") 86 is configured to store various types of data, e.g., map data, route calculation data, image data, and sound data. Those pieces of data are used, for example, to provide a navigation service to the driver (or occupant), determine an operation schedule (hereinafter also referred to as "plan") of the engine 20 and/or the second motor generator MG2, and determine a "target state of charge" of the storage battery 64.

The various types of data stored in the NVDB 86 are stored in a storage device such as a magnetic disk (HDD) or a semiconductor memory.

The map data includes road data including road identification information for identifying each road on the map data and guidance data including intersection names and the like used for route guidance.

The route calculation data includes "link information", which is information on road portions of a road network, "node information", which is information on intersections of the road network, and "regulation information", which is information on road regulations. The node information and the link information are used for "downhill search (search for subject downhill sections)", "downhill control", "congestion control", and the like. Each link is accompanied by inclination data of a road section corresponding to the link and/or elevation data of points on both ends of the road section corresponding to the link.

The travel data acquisition part 87 is configured to acquire, at a predetermined interval, travel data such as a current position and a travel speed of the vehicle 10 until the power switch 81 of the vehicle is turned off after being turned on. The predetermined interval is, for example, a predetermined time interval (e.g., 100 milliseconds) and a predetermined distance interval (e.g., 100 meters).

The travel data acquisition part 87 includes a global positioning system (GPS) receiver. The travel data acquisition part 87 is configured to use the GPS receiver to receive GPS information transmitted by GPS satellites. The travel data acquisition part 87 is configured to analyze the received GPS information, thereby acquiring position information (latitude and longitude) on the vehicle.

The travel environment data acquisition part 88 includes a device for acquiring information from VICS (trademark). The travel environment data acquisition part 88 is configured to acquire information on a travel environment around the vehicle during the vehicle travel, e.g., congestion information, traffic regulation information, and weather information, namely, route information, and provide the route information to the NVECU 74 as travel environment data.

The travel data storage part 89 is configured to store the travel data acquired by the travel data acquisition part 87 and the travel environment data acquired by the travel environment data acquisition part 88. In this case, the travel data and the travel environment data for the travel of the vehicle for one time are associated with each other to be stored. As a result, the elevations of the points on both ends of the link corresponding to the road on which the vehicle 10 has actually traveled can be learned. The elevation is calculated from a signal output from an atmospheric pressure sensor included in the engine state amount sensor 99.

The hybrid vehicle 10 also includes a so-called plug-in hybrid vehicle. The plug-in hybrid vehicle further includes, in addition to the configuration illustrated in FIG. 1, a charge inlet (charge connector) for connecting a charge cable for supplying power from a charge stand outside the vehicle to the vehicle 10, and a charger and a charge relay interposed on a power line for connecting between the charge inlet and the storage battery 64. The storage battery 64 of the plug-in hybrid vehicle is charged while the vehicle 10 is stopped.

(Overview of Operation)

A description is now given of an overview of an operation of the control device.

When the vehicle 10 is traveling on a downhill, the accelerator operation amount AP frequently becomes "0", and the brake operation amount BP frequently takes a large value. Thus, when the vehicle 10 is traveling on the downhill, the power generated by the regenerative braking using the first motor generator MG1 is supplied to the storage battery 64. Further, the vehicle 10 is hardly ever required to be accelerated when the vehicle 10 is traveling on the downhill, and hence the consumption of the power is small. Thus, the state of charge SOC of the storage battery 64 greatly increases during the travel of the vehicle 10 on the downhill. On the other hand, when the vehicle 10 is traveling on a congested road, the accelerator operation amount AP of the driver of the vehicle 10 is small, and hence the output required for the engine 20 is small. Thus, the travel (namely, the electric travel) using only the second motor generator MG2 is frequently carried out. Further, on this occasion, the travel speed of the vehicle 10 is low, and hence the power that can be recovered by the regenerative braking is small. Thus, the state of charge SOC of the storage battery 64 greatly decreases during the travel of the vehicle 10 in the congested section.

Meanwhile, when the storage battery 64 repeats a change in state of charge SOC under a state where the state of charge SOC is extremely high or extremely low, performance degradation, e.g., a decrease in the capacity, progresses. Thus, the control device is configured to set an upper limit and a lower limit of the state of charge SOC in order to prevent the performance degradation of the storage battery 64, and manage the state of charge SOC so that the state of charge SOC does not deviate from (exceed) a range between the upper limit and the lower limit. This range is hereinafter also referred to as "permissible range" or "management range MGR".

Figure 2A:
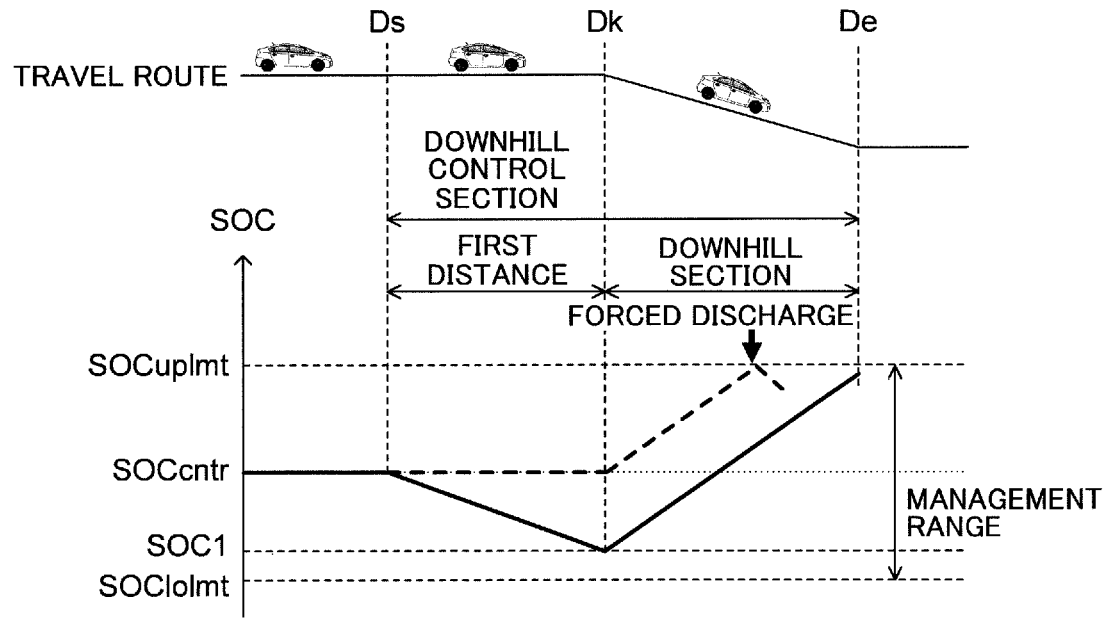
FIG. 2A is a graph for schematically showing a transition of a state of charge of a storage battery in downhill control carried out by the control device for a hybrid vehicle illustrated in FIG. 1.

More specifically, the control device is configured to carry out forced discharge of the storage battery 64 when the state of charge SOC becomes more than the upper limit (hereinafter also referred to as "upper limit state of charge SOCuplmt") of the management range MGR. The forced discharge is control of inhibiting the charge of the storage battery 64 and stopping the operation of the engine 20 to carry out the electric travel of the vehicle 10 through use of the power stored in the storage battery 64 for the second motor generator MG2 (to forcefully decrease the state of charge SOC to a value less than the upper limit state of charge SOCuplmt). In this case, the braking force generated by the driver of the vehicle 10 releasing his or her foot from the accelerator pedal, and depressing the brake pedal is not recovered as electric energy to the storage battery 64. As illustrated as the broken line of FIG. 2A, the forced discharge is carried out, for example, when the vehicle 10 is traveling on a downhill.

Figure 2B:
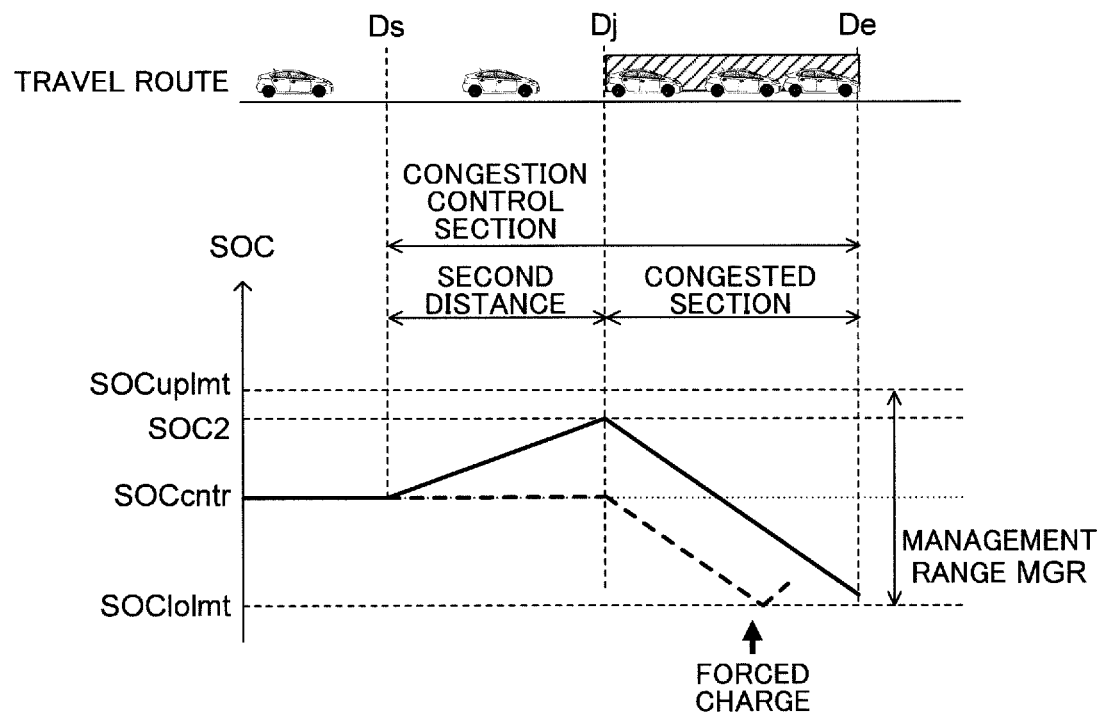
FIG. 2B is a graph for schematically showing a transition of the state of charge of the storage battery in congestion control carried out by the control device for a hybrid vehicle illustrated in FIG. 1.

In addition, the control device is configured to carry out forced charge of the storage battery 64 when the state of charge SOC becomes less than the lower limit (hereinafter also referred to as "lower limit state of charge SOClolmt") of the management range MGR. The forced charge is control of forcefully operating the engine 20 and charging the storage battery 64 through use of the output of the engine 20 (forcefully increasing the state of charge SOC to a value more than the lower limit state of charge SOClolmt). As a result, fuel is greatly consumed for a reason other than the vehicle travel. As illustrated as the broken line of FIG. 2B, the forced charge is carried out, for example, when the vehicle 10 is traveling on a congested road. In this manner, the execution of the forced discharge and the forced charge leads to the degradation in the fuel efficiency.

Thus, the control device is configured to predict whether or not a downhill section (hereinafter also referred to as "subject downhill section") exists in a planned travel route of the vehicle 10 based on the data stored in the NVDB 86 and the data (the position information on the vehicle 10 and the road information) acquired by the travel data acquisition part 87. Then, when the control device extracts a subject downhill section from the planned travel route, the control device decreases the state of charge SOC of the storage battery 64 in advance so that the state of charge SOC does not reach the upper limit SOCuplmt until the vehicle 10 has passed through the subject downhill section. For example, as illustrated as the solid line in FIG. 2A, the control device controls the state of charge SOC of the storage battery 64 so that the state of charge SOC starts to decrease from a normal state of charge SOCcntr when the vehicle 10 reaches a point Ds a predetermined first distance before a start point Dk of the "extracted subject downhill section" so as to be a first state of charge SOC1 at the start point Dk of the subject downhill section. This control is hereinafter referred to as "downhill control". Subsequently, the state of charge SOC is increased by the regenerative braking when the vehicle 10 travels in the subject downhill section, but the state of charge SOC does not reach the upper limit state of charge SOCuplmt even when the vehicle 10 reaches an end point De of the subject downhill section. As a result, the control device can avoid the execution of the forced discharge, and can maximally recover the electric energy generated by the regenerative braking.

Similarly, the control device is configured to predict whether or not a congested section (hereinafter also referred to as "subject congested section") exists in a planned travel route of the vehicle 10 based on the above-mentioned data. Then, when the control device extracts a subject congested section from the planned travel route, the control device increases the state of charge SOC of the storage battery 64 in advance so that the state of charge SOC does not reach the lower limit SOClolmt until the vehicle 10 has passed through the subject congested section. For example, as illustrated as the solid line in FIG. 2B, the control device controls the state of charge SOC of the storage battery 64 so that the state of charge SOC starts to increase from the normal state of charge SOCcntr when the vehicle 10 reaches a point Ds a predetermined second distance before a start point Dj of the "extracted subject congested section" so as to be a second state of charge SOC2 at the start point Dj of the subject congested section. This control is hereinafter referred to as "congestion control". Subsequently, the state of charge SOC is decreased by the power of the storage battery 64 being consumed when the vehicle 10 travels in the subject congested section, but the state of charge SOC does not reach the lower limit state of charge SOClolmt even when the vehicle 10 reaches an end point De of the subject congested section. As a result, the control device can avoid the execution of the forced charge, and can prevent the degradation of the fuel efficiency.

However, when the vehicle 10 is caught in an "unexpected" congestion during the "downhill control", the state of charge SOC may further decrease from the first state of charge SOC1 to become less than the lower limit state of charge SOClolmt. In this case, the forced charge is carried out (started). Subsequently, when the state of charge SOC becomes more than the lower limit state of charge SOClolmt by a predetermined amount, the forced charge is finished. When the downhill control is resumed after the forced charge is finished, the state of charge SOC decreases. When the vehicle 10 is again caught in an unexpected congestion on this occasion, the state of charge SOC again decreases below the lower limit state of charge SOClolmt, and the forced charge is carried out. When the forced charge is carried out a plurality of times in this way, the fuel efficiency greatly degrades.

Meanwhile, when the vehicle 10 travels on an "unexpected" downhill during the "congestion control", the state of charge SOC may further increase from the second state of charge SOC2 to become more than the upper limit state of charge SOCuplmt. In this case, the control device carries out (starts) the forced discharge. Subsequently, when the state of charge SOC becomes less than the upper limit state of charge SOCuplmt by a predetermined amount, the forced discharge is finished. When the congestion control is resumed after the forced charge is finished, the state of charge SOC increases. When the vehicle 10 again travels on an unexpected downhill on this occasion, the state of charge SOC again increases above the upper limit state of charge SOCuplmt, and the forced discharge is carried out. When the forced discharge is carried out a plurality of times in this way, the fuel efficiency greatly degrades.

Figure 3:
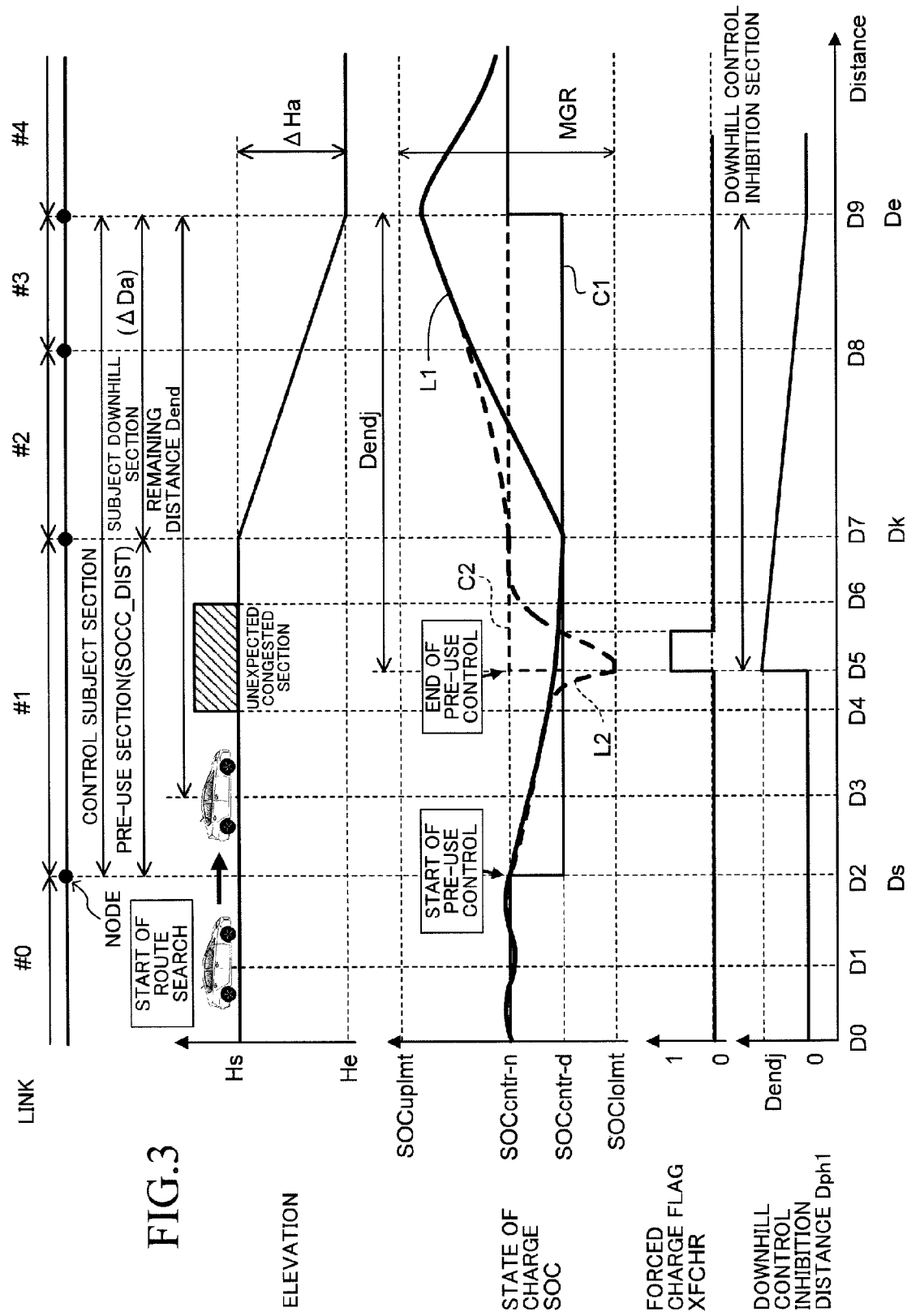
FIG. 3 is a diagram for illustrating in more detail the transition of the state of charge of the storage battery in the downhill control carried out by the control device for a hybrid vehicle illustrated in FIG. 1.
Figure 4:
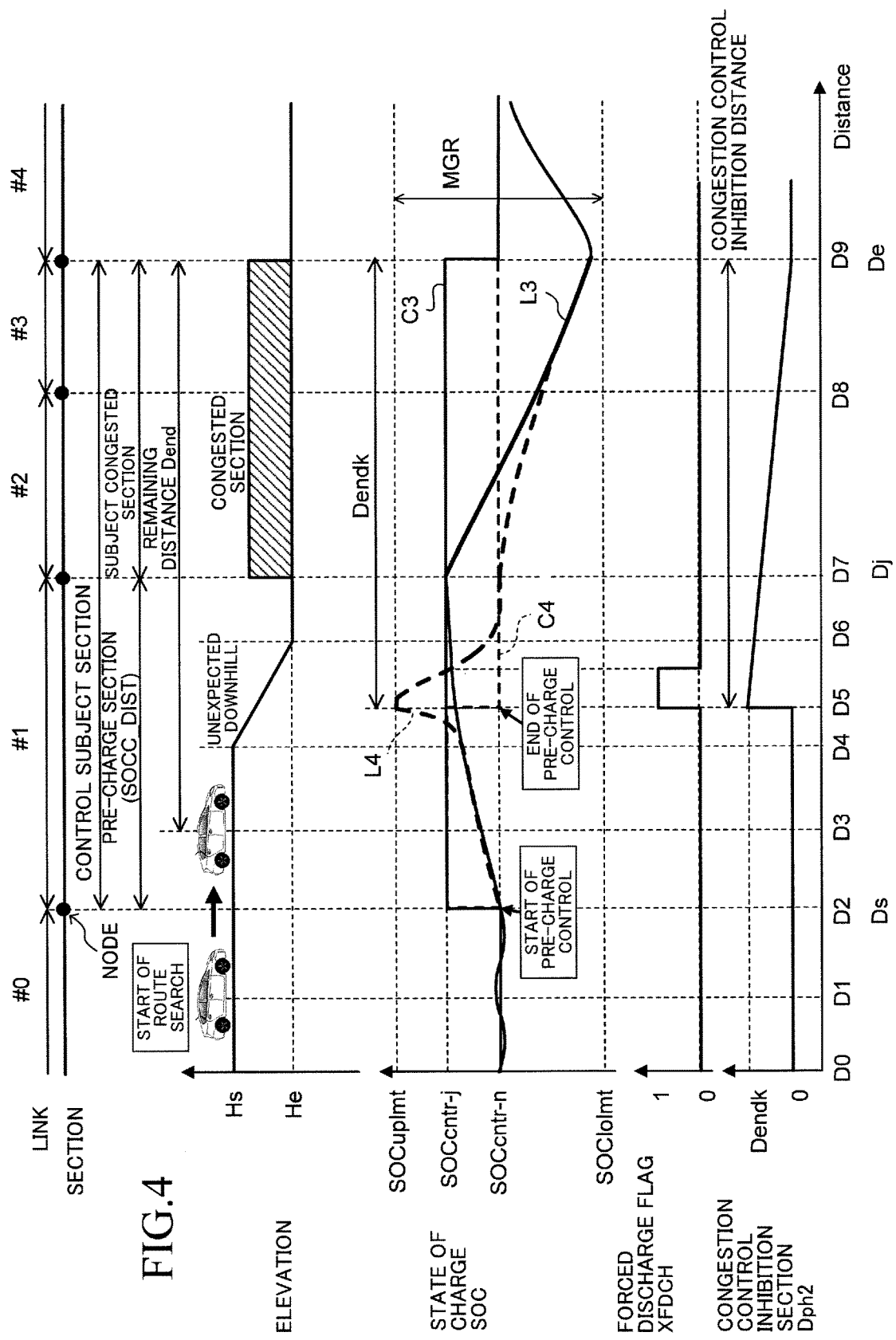
FIG. 4 is a diagram for illustrating in more detail the transition of the state of charge of the storage battery in the congestion control carried out by the control device for a hybrid vehicle illustrated in FIG. 1.

Thus, as illustrated in FIG. 3, when the forced charge is carried out during the downhill control, the control device inhibits the downhill control from a start point D5 of the forced charge to the point De at which the vehicle 10 has passed through the downhill control section. Further, as illustrated in FIG. 4, when the forced discharge is carried out during the congestion control, the control device inhibits the congestion control from the start point D5 of the forced discharge to the point De at which the vehicle 10 has passed through the congestion control section. Referring to FIG. 3 and FIG. 4, a detailed description is given of the operation of the control device.

The "forced charge" and the "forced discharge" can be respectively considered as control of forcefully charging the storage battery 64 and control of forcefully discharging the storage battery 64 so that the state of charge SOC returns to the management range MGR (permissible range of from the lower limit state of charge SOClolmt to the upper limit state of charge SOCuplmt) when the state of charge SOC deviates from the management range MGR. Thus, the "forced charge" and the "forced discharge" are also referred to as "return control".

(Operations)
<Operation of Downhill Control>
FIG. 3 is a diagram for illustrating the elevation of the road, the state of charge SOC of the storage battery 64, a forced charge flag XFCHR, and a downhill control inhibition distance Dph1 with respect to the distance of the planned travel route. When the value of the forced charge flag XFCHR is "1", the forced charge flag XFCHR represents the state where the forced charge is carried out. When the value is "0", the forced charge flag XFCHR represents the state where the forced charge is not carried out. The downhill control inhibition distance Dph1 is a parameter used to determine whether the execution of the downhill control is permitted or inhibited. When the value of the downhill control inhibition distance Dph1 is more than "0", the downhill control is inhibited. On the other hand, when the value of the downhill control inhibition distance Dph1 is "0", the downhill control is permitted.

The planned travel route illustrated in FIG. 3 is formed of five road sections corresponding to a link #0 to a link #4. A connection point between neighboring links is referred to as "node". The planned travel route includes a downhill continuing from a flat road at an elevation Hs to a flat road at an elevation He (elevation Hs>elevation He). The flat road before the downhill is formed of two sections corresponding to the link #0 and the link #1. The downhill is formed of two sections corresponding to the link #2 and the link #3. The flat road after the downhill is formed of one section corresponding to the link #4.

The control device is configured to set the target state of charge SOCcntr to a standard state of charge SOCcntr-n less than the upper limit state of charge SOCuplmt and more than the lower limit state of charge SOClolmt in normal travel sections excluding the "downhill control section". For example, the upper limit state of charge SOCuplmt, the lower limit state of charge SOClolmt, and the standard state of charge SOCcntr-n are set to values corresponding to 80% of full charge, 40% of the full charge, and 60% of the full charge, respectively.

The PMECU 70 is configured to control the engine 20, the second motor generator MG2, and the first motor generator MG1 so that the driving force and/or the braking force required for the vehicle 10 are/is satisfied, and the actual state of charge SOC approaches the standard state of charge SOCcntr-n in the normal travel. In the example illustrated in FIG. 3, the SOC of the storage battery 64 at a point D0 is controlled to be a value close to the standard state of charge SOCcntr-n.

The NVECU 74 is configured to carry out a "downhill search" and a "congestion search" each time a predetermined period (in this example, 5 minutes, which is a time interval of update of the VICS information) has elapsed. It is assumed that the vehicle 10 has reached a point D1 at the timing of the execution of the downhill search and the congestion search. At this time point, the vehicle 10 is in the normal travel state, and the NVECU 74 is thus carrying out neither the downhill control nor the congestion control. The description continues assuming that the two sections corresponding to the link #2 and the link #3 correspond to the subject downhill section in which the downhill control is to be carried out.

The NVECU 74 is configured to extract (identify) the subject downhill section that is subject to the "downhill control" on the travel route during the "downhill search". Specifically, based on the information in the NVDB 86, the NVECU 74 identifies, as the "subject downhill section", a section that corresponds to a link group (hereinafter referred to as "first link group") that is a single link or a plurality of successive links out of a link group corresponding to the planned travel route, and satisfies all the following conditions. Those conditions are also referred to as "subject downhill section identification conditions" or "first predetermined conditions". The following conditions are only an example, and the present invention is not limited to this example.

(Subject Downhill Section Identification Conditions)
(1) The sections corresponding to the respective links of the first link group are within a certain distance (e.g., within a 10-kilometer radius) from the current position of the vehicle 10.

(2) Any one of the sections corresponding to the respective links of the first link group has a downward inclination less than a predetermined threshold inclination. The inclination has a larger positive value as an uphill becomes steeper, and has a smaller negative value (negative value larger in the absolute value) as a downhill becomes steeper.

(3) The elevation Hs of a start point of the first link group is more than the elevation He of an end point of the first link group (Hs>He), and the absolute value of a difference thereof (elevation difference $\Delta Ha=|Hs-He|$) is equal to or more than a predetermined elevation difference (SOC_STL_H).

(4) A total distance $\Delta Da$ of the sections corresponding to the first link group is equal to or more than a predetermined distance (SOC_STL_D).

In the example illustrated in FIG. 3, a first link group formed of the link #2 and the link #3 satisfies the conditions (1) to (4), and the road section (namely, a section from a point D7 to a point D9) corresponding to the link #2 and the link #3 is extracted as the subject downhill section. The NVECU 74 stores the latitude and the longitude of the start point Dk (namely, the point D7) of the extracted subject downhill section, and the latitude and the longitude of the end point De (namely, the point D9) of the identified subject downhill section.

Further, the NVECU 74 identifies a point Ds a predetermined first distance (state-of-charge adjustment distance SOCC_DIST) before the start point Dk of the subject downhill section, sets the latitude and the longitude of the point Ds as the latitude and the longitude of the "start point Ds of the downhill control", and notifies the PMECU 70 of the latitude and the longitude together with the latitudes and the longitudes of the "start point Dk of the subject downhill section" and the "end point De of the subject downhill section". The NVECU 74 may newly identify the point of a node closest to the point Ds, and closer to the vehicle 10 than the point Ds as the point Ds. In other words, the first distance may be a distance having a certain margin. The section (namely, link #1) from the downhill control start point Ds (namely, the point D2) to the start point Dk (point D7) of the subject downhill section may be referred to as "pre-use section". The downhill control in the "pre-use section" is also particularly referred to as "pre-use control". In the example illustrated in FIG. 3, the state-of-charge adjustment distance SOCC_DIST and the section corresponding to the link #1 match each other. A section that is the sum of the pre-use section and the subject downhill section is a section in which the downhill control is carried out, and is thus also referred to as "first control section (downhill control section)".

Further, when the downhill control start point Ds (namely, the point D2), the start point Dk (namely, the point D7) of the subject downhill section, and the downhill control end point De (the end point De of the subject downhill section, namely, the point D9) are updated, the NVECU 74 notifies the PMECU 70 of those points.

The PMECU 70 (and the battery ECU 71) is configured to acquire the current location (current position) of the vehicle 10 from the NVECU 74 as necessary. When the downhill control section is determined, and the current location of the vehicle 10 matches the downhill control start point Ds (when the vehicle 10 reaches the point D2 of FIG. 3), the downhill control (pre-use control) is carried out. More specifically, when the current location of the vehicle 10 matches the downhill control start point Ds, the PMECU 70 (and the battery ECU 71) changes the target state of charge SOCcntr from the standard state of charge SOCcntr-n to a target state of charge (also referred to as "low state of charge" and "first state of charge" for the sake of convenience) SOCcntr-d during the downhill control. The target state of charge SOCcntr-d during the downhill control is a value less than the normal standard state of charge SOCcntr-n (60% of the full charge) and more than the lower limit state of charge SOClolmt (40% of the full charge), and is set, for example, to 50% of the full change.

Incidentally, the hybrid vehicle 10 travels in a hybrid travel mode (HV mode). The hybrid travel mode is a widely known mode described in Japanese Patent Application Laid-open Nos. 2013-154718 and 2013-154715.

Simply put, the hybrid travel mode is a travel mode of permitting use of the internal combustion engine 20 in addition to the second motor generator MG2 when the vehicle 10 is caused to travel. Specifically, the hybrid travel mode is a mode of driving the second motor generator MG2 and simultaneously operating the internal combustion engine 20 at an operation point at which an operation efficiency becomes maximum to cause the vehicle 10 to travel while the required torque (required driving force, namely, a user required torque required by the user) required for the vehicle 10 is satisfied by the outputs of the second motor generator MG2 and the internal combustion engine 20.

In this travel mode, when the output required for the internal combustion engine 20 is less than a threshold (when the internal combustion engine 20 cannot be operated at the optimal operation point), the operation of the internal combustion engine 20 is stopped. On the other hand, when the output required for the internal combustion engine 20 is equal to or more than the threshold, the internal combustion engine 20 is operated at the optimal operation point so as to satisfy the required output. As a result, an insufficient amount of the torque (driving force) with respect to the required torque is compensated by the second motor generator MG2, and simultaneously, the storage battery 64 is charged by the output of the internal combustion engine 20. Further, as the state of charge SOC decreases with respect to the target state of charge SOCcntr, an "output required to charge the storage battery 64" from the internal combustion engine 20 increases. Therefore, as the state of charge SOC decreases, the internal combustion engine 20 is more likely to be operated.

A description is now given of an operation when an "unexpected congestion" is not occurring in the pre-use section. The "unexpected congestion" includes not only a sudden congestion, but also a congestion that cannot be extracted (a congestion that is determined not to satisfy conditions for extraction as a subject congested section described later) by the NVECU 74 as a congestion due to a scale of the congestion and a precision of the congestion information at the time of planning. In the pre-use section, the PMECU 70 operates the second motor generator MG2 so as to consume the power, thereby decreasing the state of charge SOC (refer to a solid line L1 of FIG. 3) so that the state of charge SOC approaches the low state of charge (first state of charge) SOCcntr-d.

In the example illustrated in FIG. 3, the state of charge SOC decreases to the first state of charge SOCcntr-d until the vehicle 10 travels in the pre-use section, and reaches the start point Dk of the subject downhill section. The state-of-charge adjustment distance SOCC_DIST is set as a distance long enough for the PMECU 70 to operate the second motor generator MG2 so as to consume the power stored in the storage battery 64 so that the state of charge SOC of the storage battery 64 approaches from the standard state of charge SOCcntr-n to the first state of charge SOCcntr-d in this way. The state-of-charge adjustment distance SOCC_DIST is set to, for example, approximately 5 kilometers, but may be shorter or longer than 5 kilometers depending on the travel route and travel conditions of the vehicle 10.

Then, when the vehicle 10 starts the travel of the subject downhill section, the regenerative braking comes to be frequently carried out by using the first motor generator MG1 and the second motor generator MG2. As a result, the power (regenerative energy) generated by the regenerative braking is supplied to the storage battery 64, and the state of charge SOC thus gradually increases. In other words, the NVECU 74 extracts, as the subject downhill section, a downhill where the regenerative energy is more than the energy used for the travel, and the state of charge SOC consequently increases.

When the current location of the vehicle 10 matches the downhill control end point De (that is, when the vehicle 10 reaches the point D9 of FIG. 3), the PMECU 70 (and the battery ECU 71) finishes the downhill control. More specifically, the PMECU 70 (and the battery ECU 71) changes (resets) the target state of charge SOCcntr from the first state of charge SOCcntr-d to the standard state of charge SOCcntr-n. Subsequently, the vehicle 10 travels on the flat road (section corresponding to the link #4). Thus, the state of charge SOC gradually approaches the standard state of charge SOCcntr-n. The NVECU 74 may notify the PMECU 70 of a state where the current location of the vehicle reaches the "point Ds, Dk, or De", and the PMECU 70 may start or finish the downhill control in accordance with the notification.

Incidentally, as described above, when an "unexpected congestion" occurs in the pre-use section, and the vehicle 10 is caught in the congestion, the state of charge SOC may rapidly decrease in an "unexpected congestion" section as represented as a broken line L2 of FIG. 3 to decrease below the lower limit state of charge SOClolmt (first threshold).

When the state of charge SOC becomes less than the lower limit state of charge SOClolmt, the forced charge of the storage battery 64 is carried out. In this case, even when the internal combustion engine 20 cannot be operated at the optimal operation point, the PMECU 70 forcefully operates the internal combustion engine 20 for the forced charge, uses the output of the internal combustion engine 20 to cause the second motor generator MG2 and the first motor generator MG1 to generate the power, and uses the generated power to charge the storage battery 64.

Incidentally, in a case of control by the related-art device, the state of charge SOC is increased to 50% (equal to the first state of charge SOCcntr-d in this example) by the forced charge, and the downhill control is then resumed. In other words, the target state of charge SOCcntr is set to the first state of charge SOCcntr-d. However, even after the state of charge SOC is increased to 50%, the state of charge SOC tends to be decreased by the downhill control, and hence when the vehicle 10 is again caught in the congestion, the state of charge SOC may decrease again to become less than the lower limit state of charge SOClolmt. As a result, the forced charge may be carried out. With the related-art device, the downhill control and the forced charge may be repeated in this way.

Thus, when the state of charge SOC becomes less than the lower limit state of charge SOClolmt during the downhill control, the control device changes the value of the forced charge flag XFCHR from "0" to "1" to carry out the forced charge. On this occasion, at the start point D5 of the forced charge, the control device further sets the value of the downhill control inhibition distance Dph1 to a remaining distance Dend (in this case, Dendj) at the point D5. The remaining distance Dend is a distance between the point at which the vehicle 10 is traveling and the end point De of the downhill control section. Subsequently, until the vehicle 10 reaches the end point De of the downhill control section, the control device sets the value of the downhill control inhibition distance Dph1 to the remaining distance Dend at the travel point of the vehicle 10. Thus, the value of the downhill control inhibition distance Dph1 decreases in accordance with the remaining distance Dend, and becomes 0 at the end point De (that is, the point D9) of the downhill control section.

As described above, the downhill control is inhibited while the downhill control inhibition distance Dph1 presents a positive value. In other words, when the forced charge occurs in the downhill control section, the control device changes the target SOC from the first state of charge SOCcntr-d to the standard state of charge SOCcntr-n, and maintains the value at the standard state of charge SOCcntr-n until the end point De of the downhill control section. This control is hereinafter also referred to as "downhill control resumption inhibition control". When the state of charge SOC is increased to the first state of charge SOCcntr-d by the forced charge, the control device finishes the forced charge, and changes the value of the forced charge flag XFCHR to "0".

<Operation of Congestion Control>

FIG. 4 is a diagram for illustrating the elevation of the road, the state of charge SOC of the storage battery 64, a forced discharge flag XFDCH, and a congestion control inhibition distance Dph2 with respect to the distance of the planned travel route. When the value of the forced discharge flag XFDCH is "1", the forced discharge flag XFDCH represents the state where the forced discharge is carried out. When the value is "0", the forced discharge flag XFDCH represents the state where the forced discharge is not carried out. The congestion control inhibition distance Dph2 is a parameter used to determine whether the execution of the congestion control is permitted or inhibited. When the value of the congestion control inhibition distance Dph2 is more than "0", the congestion control is inhibited. On the other hand, when the value of the congestion control inhibition distance Dph2 is "0", the congestion control is permitted.

The planned travel route illustrated in FIG. 4 is formed of five road sections corresponding to the link #0 to the link #4 as in FIG. 3. The planned travel route includes a downhill from a flat road at the elevation Hs to a flat road at the elevation He (elevation Hs>elevation He). The downhill is included in the link #1, and is a downhill that does not satisfy the above-mentioned conditions for the subject downhill in the distance and the elevation difference, and is thus not extracted as a subject of the downhill control (hereinafter referred to as "unexpected downhill"). In this example, the control device recognizes all the sections (link #0 to link #4) illustrated in FIG. 4 as flat roads.

The NVECU 74 is configured to carry out the "downhill search" and the "congestion search" each time the predetermined period (in this example, 5 minutes, which is the time interval of the update of the VICS information) has elapsed. It is assumed that the vehicle 10 has reached the point D1 at the timing of the execution of the downhill search and the congestion search. At this time point, the vehicle 10 is in the normal travel state, and the NVECU 74 is thus carrying out neither the downhill control nor the congestion control. The description continues assuming that the two sections corresponding to the link #2 and the link #3 correspond to a congested section in which the congestion control is carried out.

The NVECU 74 is configured to extract (identify) the subject congested section that is subject to the "congestion control" on the travel route during the "congestion search". Specifically, based on the information in the NVDB 86, the NVECU 74 identifies, as the "subject congested section", a section corresponding to a link group (hereinafter referred to as "second link group") that is a single link or a plurality of successive links out of a link group that corresponds to the planned travel route, and satisfies all the following conditions. Those conditions are also referred to as "subject congested section identification conditions" or "second predetermined conditions". The following conditions are only an example, and the present invention is not limited to this example. The congestion as used herein includes "congestion" and "jam" defined in the VICS information.

(Subject Congested Section Identification Conditions)

(1) The sections corresponding to the respective links of the second link group are within a certain distance (e.g., within a 10-kilometer radius) from the current position of the vehicle 10.

(2) A total distance ΔDb of the congestion in the sections corresponding to the second link group is equal to or more than the predetermined distance.

In the example illustrated in FIG. 4, the second link group formed of the link #2 and the link #3 satisfies the conditions (1) and (2), and the road section (namely, a section from the point D7 to the point D9) corresponding to the link #2 and the link #3 is extracted as the subject congested section. The NVECU 74 stores the latitude and the longitude of the start point Dj (namely, the point D7) of the extracted subject congested section, and the latitude and the longitude of the end point De (namely, the point D9) of the extracted subject congested section.

Further, the NVECU 74 identifies a point Ds a predetermined second distance (state-of-charge adjustment distance SOCC_DIST) before the start point Dj of the subject congested section, sets the latitude and the longitude of the point Ds as the latitude and the longitude of the "start point Ds of the congestion control", and notifies the PMECU 70 of the latitude and the longitude together with the latitudes and the longitudes of the "start point Dj of the subject congested section" and the "end point De of the subject congested section". The NVECU 74 may newly identify the point of a node closest to the point Ds, and closer to the vehicle 10 than the point Ds as the point Ds. In other words, the second distance may be a distance having a certain margin. The section (namely, link #1) from the congestion control start point Ds (namely, the point D2) to the start point Dj (point D7) of the subject congested section may be referred to as "pre-charge section". The congestion control in the "pre-charge section" is also particularly referred to as "pre-charge control". In the example illustrated in FIG. 4, the state-of-charge adjustment distance SOCC_DIST and the section corresponding to the link #1 match each other. A section that is the sum of the pre-charge section and the subject congested section is a section in which the congestion control is carried out, and is thus also referred to as "second control section (congestion control section)".

Further, when the congestion control start point Ds (namely, the point D2), the start point Dj (namely, the point D7) of the subject congested section, and the congestion control end point De (the end point De of the subject congested section, namely, the point D9) are updated, the NVECU 74 notifies the PMECU 70 of those points.

The PMECU 70 (and the battery ECU 71) is configured to acquire the current location (current position) of the vehicle 10 from the NVECU 74 as necessary. When the congestion control section is determined, and the current location of the vehicle 10 matches the congestion control start point Ds (when the vehicle 10 reaches the point D2 of FIG. 4), the congestion control (pre-charge control) is carried out. More specifically, when the current location of the vehicle 10 matches the congestion control start point Ds, the PMECU 70 (and the battery ECU 71) changes the target state of charge SOCcntr from the standard state of charge SOCcntr-n to a target state of charge (also referred to as "high state of charge" and "second state of charge" for the sake of convenience) SOCcntr-j during the congestion control. The target state of charge SOCcntr-j during the congestion control is a value more than the standard state of charge SOCcntr-n (60% of the full charge) and less than the upper limit state of charge SOCuplmt (80% of the full charge), and is set, for example, to 70% of the full change.

Incidentally, in the hybrid travel mode, as the state of charge SOC increases with respect to the target state of charge SOCcntr, the "output required to charge the storage battery 64" from the internal combustion engine 20 decreases. Therefore, as the state of charge SOC increases, the internal combustion engine 20 is less likely to be operated.

A description is now given of an operation when an "unexpected downhill" does not exist in the pre-charge section. The "unexpected downhill" includes a downhill that does not satisfy the above-mentioned subject downhill section identification conditions. In the pre-charge section, the PMECU 70 operates the first motor generator MG1 so as to generate the power, thereby increasing the state of charge SOC (refer to the solid line L3 of FIG. 4) so that the state of charge SOC approaches the high state of charge (second state of charge) SOCcntr-j.

In the example illustrated in FIG. 4, the state of charge SOC increases to the second state of charge SOCcntr-j until the vehicle 10 travels in the pre-charge section, and reaches the start point Dj of the subject congested section. The state-of-charge adjustment distance SOCC_DIST is set as a distance long enough for the PMECU 70 to operate the first motor generator MG1 so as to generate the power and store the power in the storage battery 64 so that the SOC of the storage battery 64 approaches from the standard state of charge SOCcntr-n to the second state of charge SOCcntr-j in this way.

Then, when the vehicle 10 starts the travel in the subject congested section, the first motor generator MG1 and the second motor generator MG2 operate as drive sources for the vehicle 10. As a result, the power stored in the storage battery 64 is consumed, and the state of charge SOC thus gradually decreases. In other words, the NVECU 74 extracts, as the subject congested section, a congestion where the energy used for the travel is more than the regenerative energy, and the state of charge SOC consequently decreases.

When the current location of the vehicle 10 matches the congestion control end point De (that is, when the vehicle 10 reaches the point D9 of FIG. 4), the PMECU 70 (and the battery ECU 71) finishes the congestion control. More specifically, the PMECU 70 (and the battery ECU 71) changes (resets) the target state of charge SOCcntr from the second state of charge SOCcntr-j to the standard state of charge SOCcntr-n.

Subsequently, the vehicle 10 travels on the flat road (section corresponding to the link #4). Thus, the state of charge SOC gradually approaches the standard state of charge SOCcntr-n.

However, when the "unexpected downhill" exists in the pre-charge section as described above, as illustrated as a broken line L4 of FIG. 4, the state of charge SOC may rapidly increase during the travel of the vehicle 10 on the "unexpected downhill" to become more than the upper limit state of charge SOCuplmt (second threshold). When the state of charge SOC becomes more than the upper limit state of charge SOCuplmt, the forced discharge of the storage battery 64 is carried out. The PMECU 70 forcefully stops the operation of the internal combustion engine 20 through the forced discharge, provides the output of the second motor generator MG2 as the driving force of the vehicle 10, and stops the charge by the first motor generator MG1.

Incidentally, in a case of control by the related-art device, the state of charge SOC is decreased to 70% (equal to the second state of charge SOCcntr-j in this example) by the forced discharge, and the pre-charge control is then resumed. In other words, the target state of charge SOCcntr is set to the second state of charge SOCcntr-j. However, even after the state of charge SOC is decreased to 70%, the state of charge SOC tends to be increased by the congestion control, and hence when the vehicle 10 again travels on the downhill, the state of charge SOC may increase again to become more than the upper limit state of charge SOCuplmt. As a result, the forced discharge may be carried out. With the related-art device, the pre-charge control and the forced discharge may be repeated in this way.

Thus, when the state of charge SOC becomes more than the upper limit state of charge SOCuplmt during the congestion control, the control device changes the value of the forced discharge flag XFDCH from "0" to "1", and carries out the forced discharge. On this occasion, at the start point D5 of the forced discharge, the control device further sets the value of a congestion control inhibition distance Dph2 to the remaining distance Dend (in this case, Dendk) at the point D5. Subsequently, until the vehicle 10 reaches the end point De of the congestion control section, the control device sets the value of the congestion control inhibition distance Dph2 to the remaining distance Dend at the travel point of the vehicle 10. Thus, the value of the congestion control inhibition distance Dph2 decreases in accordance with the remaining distance Dend, and becomes 0 at the end point De (that is, the point D9) of the congestion control section.

As described above, the congestion control is inhibited while the congestion control inhibition distance Dph2 presents a positive value. In other words, when the forced discharge occurs in the congestion control section, the control device changes the target SOC from the second state of charge SOCcntr-j to the standard state of charge SOCcntr-n, and maintains the value at the standard state of charge SOCcntr-n until the end point De of the congestion control section. This control is hereinafter also referred to as "congestion control resumption inhibition control". When the state of charge SOC is decreased to the second state of charge SOCcntr-j by the forced discharge, the control device finishes the forced discharge, and change the value of the forced discharge flag XFDCH to "0".

In this way, the "downhill control" and the "congestion control" are the control of changing, when the vehicle 10 travels in the control section (that is, the downhill control section or the congestion control section), the target state of charge SOCcntr from the standard state of charge SOCcntr-n to the specific state of charge (the first state of charge SOCcntr-d or the second state of charge SOCcntr-j), which is different from the standard state of charge SOCcntr-n, and is within the permissible range (management range MGR), in the period in which the vehicle 10 travels from the control start point Ds to at least the start point Dk or Dj of the subject section (that is, the subject downhill section or the subject congested section). The "downhill control" and the "congestion control" are also referred to as "pre-charge/discharge control".

(Actual Operation)

A description is now given of an actual operation of the control device.

<Forced Charge Flag Setting>

Figure 5:
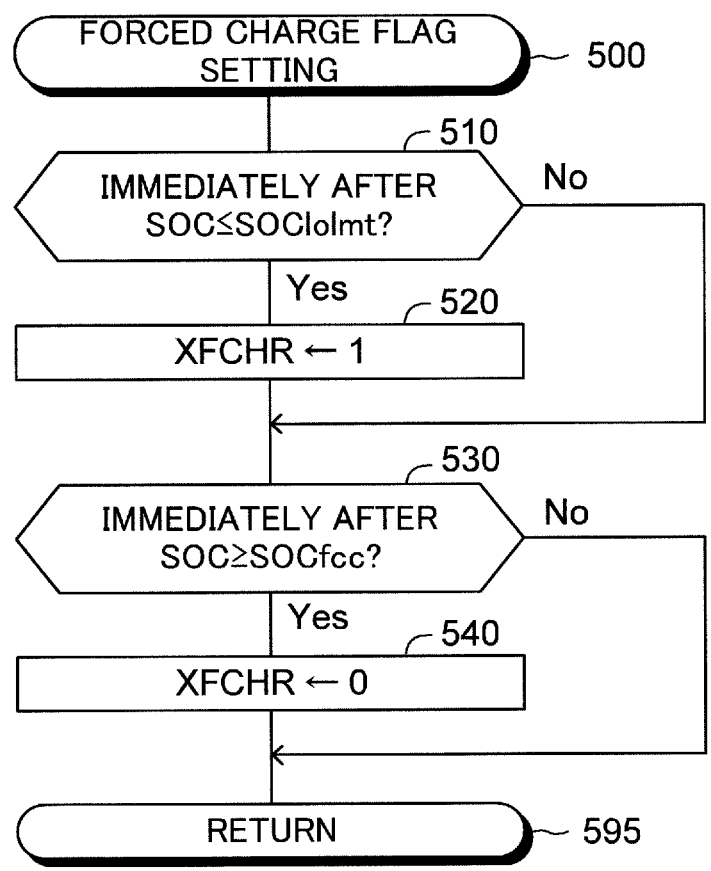
FIG. 5 is a flowchart for illustrating a "forced charge flag setting routine" executed by a CPU of a power management ECU (PMECU) of the hybrid vehicle illustrated in FIG. 1.

The PMECU 70 (actually, the CPU thereof) is configured to execute a forced charge flag setting routine illustrated as a flowchart of FIG. 5 each time a sufficiently short period (e.g., 8 milliseconds) has elapsed. Thus, the PMECU 70 starts the processing from Step 500 at a predetermined timing, and proceeds to Step 510 to determine whether or not the state of charge SOC of the storage battery 64 has become equal to or less than the lower limit state of charge SOClolmt immediately before.

When the state of charge SOC has become equal to or less than the lower limit state of charge SOClolmt immediately before, in Step 510, the PMECU 70 makes a determination "Yes", and proceeds to Step 520 to set the value of the forced charge flag XFCHR to "1". As a result, the forced charge is started (refer to Step 1055 described later).

Then, the PMECU 70 proceeds to Step 530 to determine whether or not the state of charge SOC of the storage battery 64 has become equal to or more than a forced charge reset state of charge SOCfcc immediately before. The forced charge reset state of charge SOCfcc is set to an arbitrary value equal to or more than the lower limit state of charge SOClolmt and equal to or less than the first state of charge SOCcntr-d. In the example illustrated in FIG. 3, the forced charge reset state of charge SOCfcc is set to the same value as the first state of charge SOCcntr-d. Currently, the state of charge SOC has become the lower limit state of charge SOClolmt immediately before. Thus, in Step 530, the PMECU 70 makes a determination "No", and directly proceeds to Step 595 to finish this routine.

Figure 6:
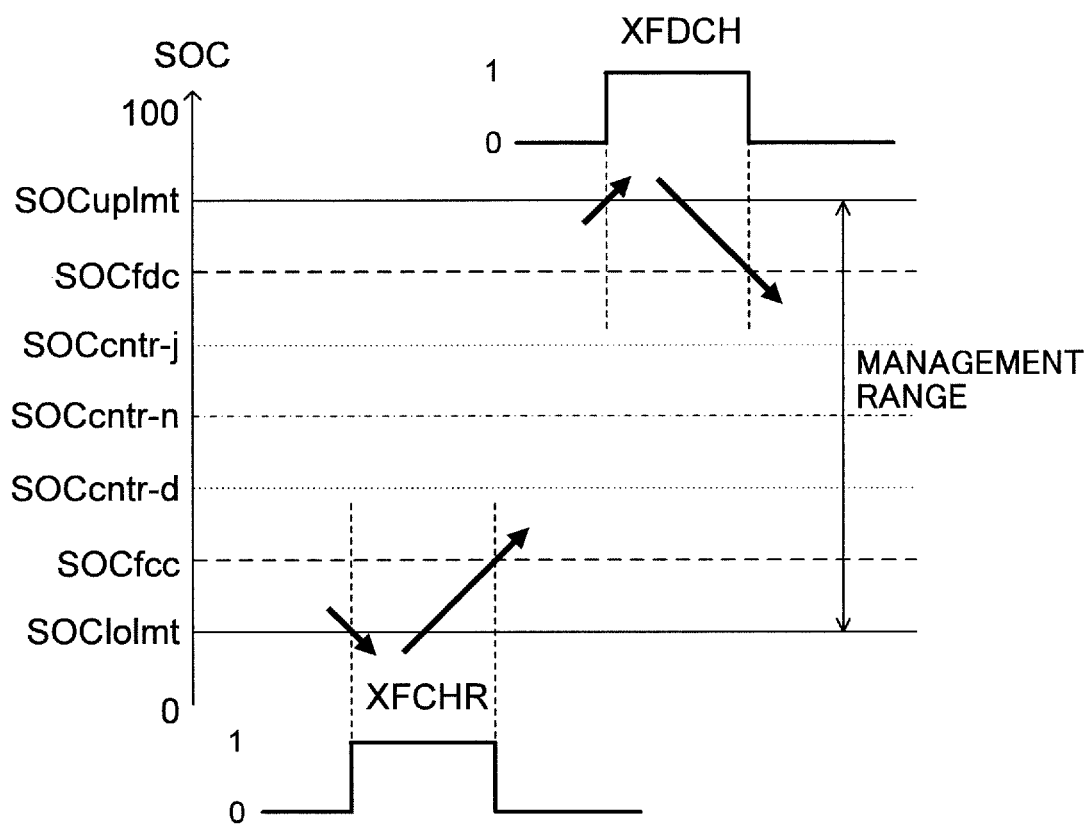
FIG. 6 is a diagram for schematically illustrating the state of charge of the storage battery for describing a "forced discharge flag" and a "forced charge flag" generated by the CPU of the PMECU of the hybrid vehicle illustrated in FIG. 1.

When the forced charge is carried out, and the state of charge SOC becomes equal to or more than the forced charge reset state of charge SOCfcc, the PMECU 70 starts the processing from Step 500 again, makes the determination "No" in Step 510, and directly proceeds to Step 530. Then, in Step 530, the PMECU 70 makes the determination "Yes", and proceeds to Step 540 to set the value of the forced charge flag XFCHR to "0". The PMECU 70 then proceeds to Step 595 to finish this routine. As a result, the forced charge is finished. Thus, as illustrated in FIG. 6, the forced charge flag XFCHR becomes "1" when the state of charge SOC of the storage battery 64 becomes equal to or less than the lower limit state of charge SOClolmt, and becomes "0" when the state of charge SOC becomes equal to or more than the forced charge reset state of charge SOCfcc.

<Forced Discharge Flag Setting>

Figure 7:
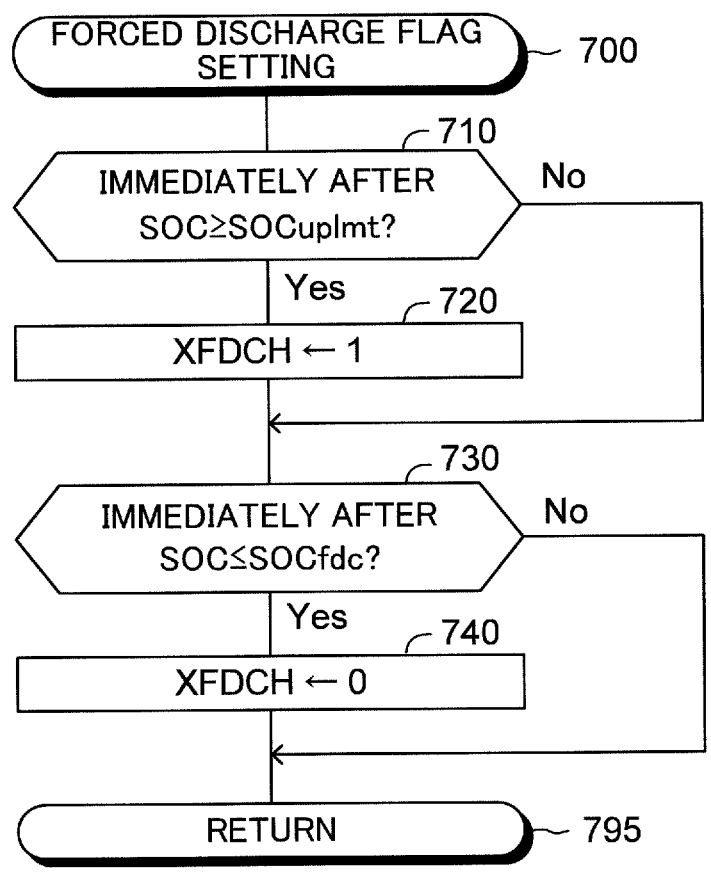
FIG. 7 is a flowchart for illustrating a "forced discharge flag setting routine" executed by the CPU of the PMECU of the hybrid vehicle illustrated in FIG. 1.

The PMECU 70 (actually, the CPU thereof) is configured to execute a forced discharge flag setting routine illustrated as a flowchart of FIG. 7 each time a sufficiently short period (e.g., 8 milliseconds) has elapsed. Thus, the PMECU 70 starts the processing from Step 700 at a predetermined timing, and proceeds to Step 710 to determine whether or not the state of charge SOC of the storage battery 64 has become equal to or more than the upper limit state of charge SOCuplmt immediately before.

When the state of charge SOC has become equal to or more than the upper limit state of charge SOCuplmt immediately before, in Step 710, the PMECU 70 makes a determination "Yes", and proceeds to Step 720 to set the value of the forced discharge flag XFDCH to "1". Thus, the forced discharge is started.

Then, the PMECU 70 proceeds to Step 730 to determine whether or not the state of charge SOC of the storage battery 64 has become equal to or less than a forced discharge reset state of charge SOCfdc immediately before. The forced discharge reset state of charge SOCfdc is set to an arbitrary value equal to or less than the upper limit state of charge SOCuplmt and equal to or more than the second state of charge SOCcntr-j. In the example illustrated in FIG. 4, the forced discharge reset state of charge SOCfdc is set to the same value as the second state of charge SOCcntr-j. Currently, the state of charge SOC has become the upper limit state of charge SOCuplmt immediately before. Thus, in Step 730, the PMECU 70 makes a determination "No", and directly proceeds to Step 795 to finish this routine.

When the forced discharge is carried out, and the state of charge SOC becomes equal to or less than the forced discharge reset state of charge SOCfdc, the PMECU 70 starts the processing from Step 700 again, makes the determination "No" in Step 710, and directly proceeds to Step 730. Then, in Step 730, the PMECU 70 makes the determination "Yes", and proceeds to Step 740 to set the value of the forced discharge flag XFDCH to "0". The PMECU 70 then proceeds to Step 795 to finish this routine. As a result, the forced discharge is finished. Thus, as illustrated in FIG. 6, the forced discharge flag XFDCH becomes "1" when the state of charge SOC of the storage battery 64 becomes equal to or more than the upper limit state of charge SOCuplmt, and becomes "0" when the state of charge SOC becomes equal to or less than the forced discharge reset state of charge SOCfdc.

<Downhill Control>

Figure 8:
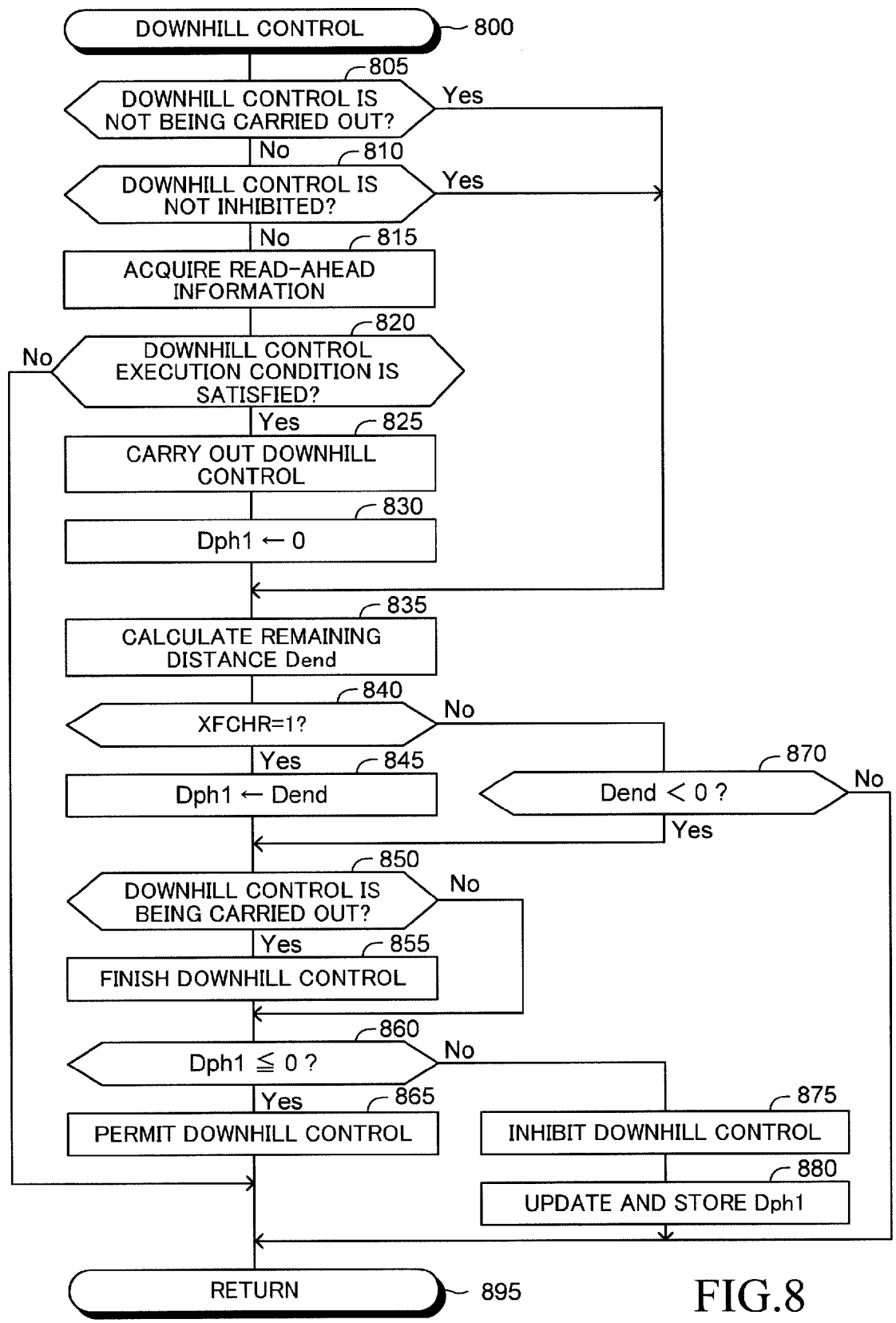
FIG. 8 is a flowchart for illustrating a "downhill control routine" executed by the CPU of the PMECU of the hybrid vehicle illustrated in FIG. 1.

The PMECU 70 (actually, the CPU thereof) is configured to execute a "downhill control routine" illustrated as a flowchart of FIG. 8 each time a certain period (e.g., 100 milliseconds) has elapsed. A description is now given of respective cases. In the following description, it is assumed that the above-mentioned "subject downhill section identification conditions" are satisfied. The downhill control inhibition distance Dph1 is set to "0" by an initial routine executed separately.

(1) When Vehicle is not Caught in "Unexpected Congestion" (Forced Charge is not Carried Out)

The PMECU 70 starts processing from Step 800 at a predetermined timing, and proceeds to Step 805 to determine whether or not the downhill control is not being carried out. When the above-mentioned processing is started while the vehicle 10 is traveling before the downhill control subject section (e.g., the point D1 of FIG. 3), the downhill control has not been carried out yet. Thus, on this occasion, the PMECU 70 makes a determination "No" in Step 805, and proceeds to Step 810 to determine whether or not the downhill control is not inhibited (whether or not the value of the downhill control inhibition distance Dph1 is equal to or less than "0").

The value of the downhill control inhibition distance Dph1 has been set to "0" by the initial routine executed separately. Thus, the downhill control is not inhibited. Thus, in Step 810, the PMECU 70 makes a determination "No", and proceeds to Step 815 to acquire "foreseeing information".

The NVECU 74 (actually, the CPU thereof) acquires the position information indicating the position of the vehicle 10 and the road information, and acquires the planned travel route of the vehicle 10 based on the position information and the road information. The NVECU 74 extracts a subject downhill section satisfying the first predetermined conditions (subject downhill section identification conditions) in the planned travel route based on road information on road sections forming the planned travel route out of the road information. When a subject downhill section is included in the planned travel route, the NVECU 74 determines the downhill control section, which is a section from the control start point Ds the predetermined distance before the start point Dk of the subject downhill section to the end point De of the subject section. The position information and the road information acquired by the NVECU 74, the subject downhill section extracted by the NVECU 74, and the downhill control section determined by the NVECU 74 are referred to as the "foreseeing information".

Then, the PMECU 70 proceeds to Step 820 to determine whether or not a downhill control execution condition is satisfied. The downhill control execution condition is satisfied when the above-mentioned "downhill control section" is determined, and the vehicle 10 reaches the start point Ds of the downhill control. Currently, the vehicle 10 has not reached the start point Ds of the downhill control. Thus, in Step 820, the PMECU 70 makes a determination "No", and directly proceeds to Step 895 to finish this routine.

When the vehicle 10 reaches the start point Ds of the downhill control, the downhill control execution condition is satisfied. On this occasion, when the PMECU 70 starts the processing from Step 800 again, in Step 820, the PMECU 70 makes a determination "Yes", and proceeds to Step 825 to carry out the downhill control. In other words, as described above, the PMECU 70 changes the target state of charge SOCcntr from the standard state of charge SOCcntr-n to the first state of charge SOCcntr-d, thereby discharging the power stored in the storage battery 64 so as to cause the actual SOC to approach the first state of charge SOCcntr-d.

Then, the PMECU 70 proceeds to Step 830 to set the value of the downhill control inhibition distance Dph1 to "0". The PMECU 70 then proceeds to Step 835 to calculate the remaining distance Dend. Then, the PMECU 70 proceeds to Step 840 to determine whether or not the value of the forced charge flag XFCHR has been set to "1" by the downhill control started for the current time. Based on the above-mentioned assumption, the value of the forced charge flag XFCHR is "0". Thus, in Step 840, the PMECU 70 makes a determination "No", and proceeds to Step 870 to determine whether or not the remaining distance Dend is less than "0" (that is, whether or not the vehicle 10 has passed the end point De of the downhill control section). Currently, the remaining distance Dend is more than "0". Thus, in Step 870, the PMECU 70 makes a determination "No", and directly proceeds to Step 895 to finish this routine.

When the PMECU 70 starts the processing from Step 800 again during the execution of the downhill control, in Step 805, the PMECU 70 makes a determination "Yes", and directly proceeds to Step 835 to calculate the remaining distance Dend. The PMECU 70 then proceeds to Step 840. In Step 840, the PMECU 70 makes the determination "No", and proceeds to Step 870 to make the determination "No". The PMECU 70 then directly proceeds to Step 895 to finish this routine.

When the vehicle 10 passes the end point De of the downhill control during the execution of the downhill control, and the PMECU 70 again starts the processing from Step 800, in Step 805, the PMECU 70 makes the determination "Yes", and directly proceeds to Step 835 to calculate the remaining distance Dend. The PMECU 70 then proceeds to Step 840.

Then, in Step 840, the PMECU 70 makes the determination "No", and proceeds to Step 870. The value of the remaining distance Dend calculated in Step 835 is less than "0". Thus, in Step 870, the PMECU 70 makes a determination "Yes", and proceeds to Step 850 to determine whether or not the downhill control is being carried out. Currently, the downhill control is being carried out, and hence, in Step 850, the PMECU 70 makes a determination "Yes", and proceeds to Step 855 to finish the downhill control. In other words, as described above, the PMECU 70 changes the target state of charge SOCcntr from the first state of charge SOCcntr-d to the standard state of charge SOCcntr-n, thereby causing the actual SOC to approach the standard state of charge SOCcntr-n. Subsequently, the PMECU 70 proceeds to Step 860 to determine whether or not the downhill control inhibition distance Dph1 is equal to or less than "0".

The value of the downhill control inhibition distance Dph1 is set to "0" when the downhill control is started. Thus, in Step 860, the PMECU 70 makes a determination "Yes", and proceeds to Step 865 to permit the downhill control. The PMECU 70 then proceeds to Step 895 to finish this routine. As a result, the downhill control is carried out when the downhill control execution condition is satisfied in next and later executions of the routine.

(2) When Vehicle is Caught in "Unexpected Congestion" (Forced Charge is Carried Out)

When the vehicle 10 is traveling before the downhill control subject section (e.g., the point D1 of FIG. 3), and the PMECU 70 starts the processing from Step 800, in Step 805, the PMECU 70 makes the determination "No", and proceeds to Step 810. Then, in Step 810, the PMECU 70 makes the determination "No", and proceeds to Step 815 to acquire the foreseeing information.

Then, the PMECU 70 proceeds to Step 820. At the current time point, the vehicle 10 has not reached the start point Ds of the downhill control. Thus, in Step 820, the PMECU 70 makes the determination "No", and directly proceeds to Step 895 to finish this routine.

When the vehicle 10 reaches the start point Ds of the downhill control, the downhill control execution condition is satisfied. On this occasion, when the PMECU 70 starts the processing from Step 800 again, in Step 820, the PMECU 70 makes a determination "Yes", and proceeds to Step 825 to carry out the downhill control. Then, the PMECU 70 proceeds to Step 830 to set the value of the downhill control inhibition distance Dph1 to "0". The PMECU 70 then proceeds to Step 835 to calculate the remaining distance Dend.

Then, the PMECU 70 proceeds to Step 840. On this occasion, the value of the forced charge flag XFCHR is "0". Thus, in Step 840, the PMECU 70 makes the determination "No", and proceeds to Step 870. Currently, the remaining distance Dend is more than "0". Thus, in Step 870, the PMECU 70 makes the determination "No", and directly proceeds to Step 895 to finish this routine.

When the vehicle 10 is caught in an unexpected congestion and reaches, for example, the point D5 of FIG. 3, and the PMECU 70 starts the processing from Step 800 again, in Step 805, the PMECU 70 makes the determination "Yes", and directly proceeds to Step 835 to calculate the remaining distance Dend. The PMECU 70 then proceeds to Step 840. As illustrated in FIG. 3, the value of the forced charge flag XFCHR is changed from "0" to "1" at the point D5. Thus, in Step 840, the PMECU 70 makes a determination "Yes", and proceeds to Step 845 to set the downhill control inhibition distance Dph1 to the remaining distance Dend. The PMECU 70 then proceeds to Step 850.

Currently, the downhill control is being carried out. Thus, in Step 850, the PMECU 70 makes the determination "Yes", and proceeds to Step 855 to finish the downhill control. The PMECU 70 then proceeds to Step 860. Currently, the downhill control inhibition distance Dph1 is a positive value. Thus, in Step 860, the PMECU 70 makes a determination "No", and proceeds to Step 875 to inhibit the downhill control. The PMECU 70 then proceeds to Step 880. In Step 880, the PMECU 70 stores the downhill control inhibition distance Dph1 (remaining distance Dend in this case) in the RAM, and proceeds to Step 895 to finish this routine.

When the vehicle 10 is traveling in the pre-use control section (e.g., the point D6 of FIG. 3) while the downhill control is inhibited, and the PMECU 70 starts the processing from Step 800, in Step 805, the PMECU 70 makes the determination "No", and proceeds to Step 810. Then, in Step 810, the PMECU 70 makes a determination "Yes", and directly proceeds to Step 835 to calculate the remaining distance Dend. The PMECU 70 then proceeds to Step 840. On this occasion, the value of the forced charge flag XFCHR is "0". Thus, in Step 840, the PMECU 70 makes the determination "Yes", and proceeds to Step 845 to set the downhill control inhibition distance Dph1 to the remaining distance Dend. The PMECU 70 then proceeds to Step 850.

On this occasion, the downhill control is not being carried out, and the downhill control inhibition distance Dph1 is thus a positive value. Thus, in Step 850, the PMECU 70 makes a determination "No", and directly proceeds to Step 860 to make the determination "No" in Step 860. The PMECU 70 then proceeds to Step 875 to maintain the state of the downhill control inhibition. Then, the PMECU 70 proceeds to Step 880 to update the value of the downhill control inhibition distance Dph1 stored in the RAM. The PMECU 70 then proceeds to Step 895 to finish this routine. Subsequently, during the travel of the vehicle 10 in the subject downhill section (the point Dk to the point De of FIG. 3), the state of the downhill control inhibition is similarly maintained.

When the vehicle 10 passes the end point De of the downhill control under the state where the downhill control is inhibited, and the PMECU 70 starts the processing from Step 800 again, in Step 805, the PMECU 70 makes the determination "No", and proceeds to Step 810 to make the determination "Yes" in Step 810. The PMECU 70 then directly proceeds to Step 835 to calculate the remaining distance Dend. Then, the PMECU 70 proceeds to Step 840 to make the determination "Yes". The PMECU 70 then proceeds to Step 845 to set the downhill control inhibition distance Dph1 to the current remaining distance Dend (in this case "0"), and proceeds to Step 850. Currently, the downhill control is not being carried out. Thus, in Step 850, the PMECU 70 makes the determination "No", and directly proceeds to Step 860.

On this occasion, the value of the downhill control inhibition distance Dph1 is "0". Thus, in Step 860, the PMECU 70 makes the determination "Yes", and proceeds to Step 865 to permit the downhill control. The PMECU 70 then proceeds to Step 895 to finish this routine. As a result, the downhill control is carried out when the downhill control execution condition is satisfied in next and later executions of the routine.

<Congestion Control>

Figure 9:
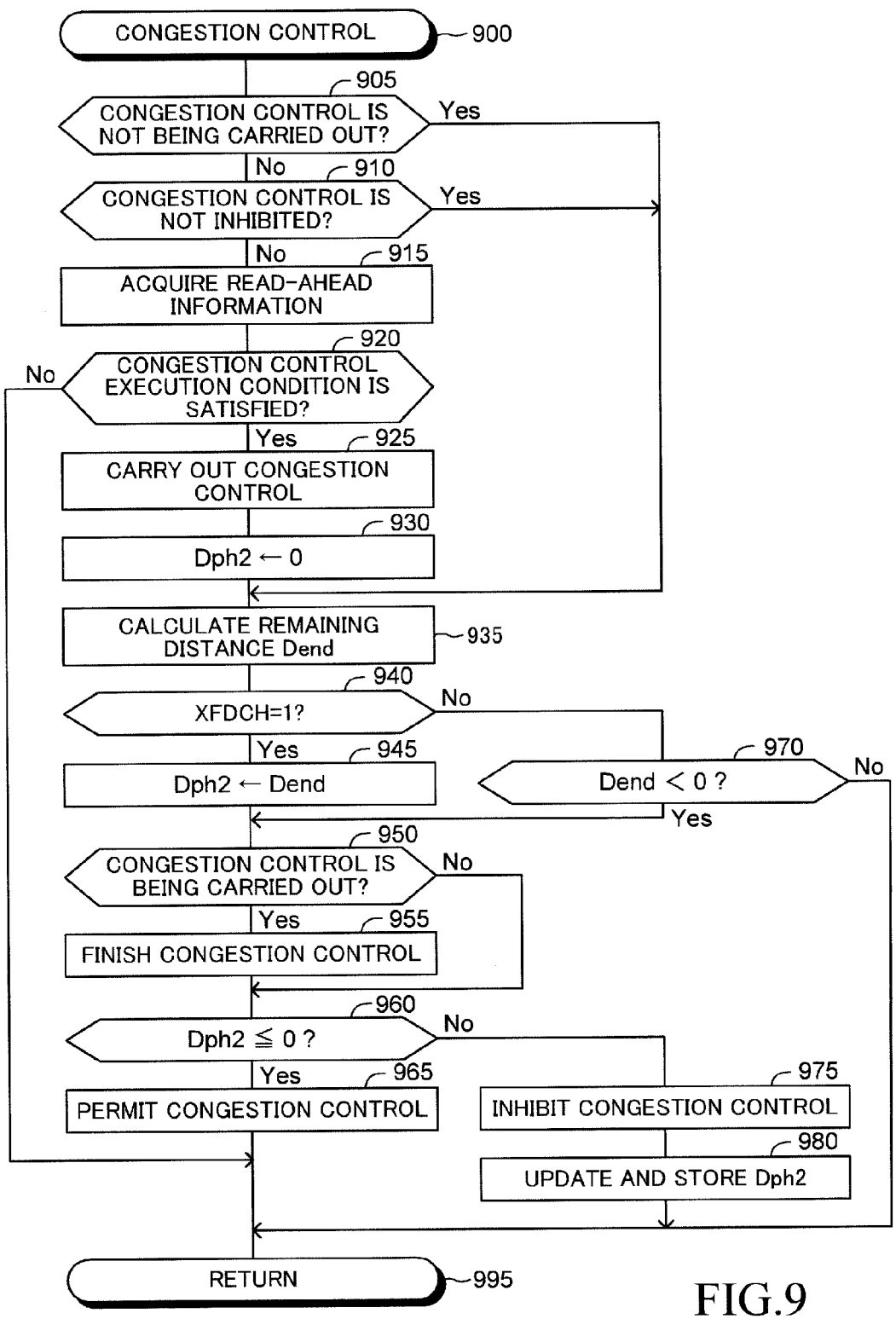
FIG. 9 is a flowchart for illustrating a "congestion control routine" executed by the CPU of the PMECU of the hybrid vehicle illustrated in FIG. 1.

The PMECU 70 (actually, the CPU thereof) is configured to execute a "congestion control routine" illustrated as a flowchart of FIG. 9 each time a certain period (e.g., 100 milliseconds) has elapsed. A description is now given of respective cases. In the following description, it is assumed that the above-mentioned "subject congested section identification conditions" are satisfied. The congestion control inhibition distance Dph2 is set to "0" by an initial routine executed separately.

(1) When Vehicle is not Traveling on "Unexpected Downhill" (Forced Discharge is not Carried Out)

The PMECU 70 starts processing from Step 900 at a predetermined timing, and proceeds to Step 905 to determine whether or not the congestion control (pre-charge control) is not being carried out. When the above-mentioned processing is started while the vehicle 10 is traveling before the congestion control subject section (e.g., the point D1 of FIG. 4), the congestion control has not been carried out yet. Thus, in Step 905, the PMECU 70 makes a determination "No", and proceeds to Step 910 to determine whether or not the congestion control is not inhibited (whether or not the value of the congestion control inhibition distance Dph2 is equal to or less than "0").

The value of the congestion control inhibition distance Dph2 has been set to "0" by the initial routine executed separately. Thus, the congestion control is not inhibited. Thus, in Step 910, the PMECU 70 makes a determination "No", and proceeds to Step 915 to acquire the "foreseeing information".

The NVECU 74 (actually, the CPU thereof) acquires the position information indicating the position of the vehicle 10 and the road information, and acquires the planned travel route of the vehicle 10 based on the position information and the road information. The NVECU 74 extracts a subject congested section satisfying the second predetermined conditions (subject congested section identification conditions) in the planned travel route based on road information on road sections forming the planned travel route out of the road information. When a subject congested section is included in the planned travel route, the NVECU 74 determines the congestion control section, which is a section from the control start point Ds the predetermined distance before the start point Dj of the subject congested section to the end point De of the subject section. The position information and the road information acquired by the NVECU 74, the subject congested section extracted by the NVECU 74, and the congestion control section determined by the NVECU 74 are referred to as the "foreseeing information".

Then, the PMECU 70 proceeds to Step 920 to determine whether or not a congestion control execution condition is satisfied. The congestion control execution condition is satisfied when the above-mentioned "congestion control section" is determined, and the vehicle 10 reaches the start point Ds of the congestion control. Currently, the vehicle 10 has not reached the start point Ds of the congestion control. Thus, in Step 920, the PMECU 70 makes a determination "No", and directly proceeds to Step 995 to finish this routine.

When the vehicle 10 reaches the start point Ds of the congestion control, the congestion control execution condition is satisfied. On this occasion, when the PMECU 70 starts the processing from Step 900 again, in Step 920, the PMECU 70 makes a determination "Yes", and proceeds to Step 925 to carry out the congestion control. In other words, as described above, the PMECU 70 changes the target state of charge SOCcntr from the standard state of charge SOCcntr-n to the second state of charge SOCcntr-j, thereby charging the power stored in the storage battery 64 so as to cause the actual SOC to approach the second state of charge SOCcntr-j.

Then, the PMECU 70 proceeds to Step 930 to set the value of the congestion control inhibition distance Dph2 to "0". The PMECU 70 then proceeds to Step 935 to calculate the remaining distance Dend. Then, the PMECU 70 proceeds to Step 940 to determine whether or not the value of the forced discharge flag XFDCH has been set to "1" by the congestion control started for the current time. Based on the above-mentioned assumption, the value of the forced discharge flag XFDCH is "0". Thus, in Step 940, the PMECU 70 makes a determination "No", and proceeds to Step 970 to determine whether or not the remaining distance Dend is less than "0" (that is, whether or not the vehicle 10 has passed the end point De of the congestion control section). Currently, the remaining distance Dend is more than "0". Thus, in Step 970, the PMECU 70 makes a determination "No", and directly proceeds to Step 995 to finish this routine.

When the PMECU 70 starts the processing from Step 900 again during the execution of the congestion control when the vehicle 10 has reached, for example, the point D3 of FIG. 4, in Step 905, the PMECU 70 makes a determination "Yes", and directly proceeds to Step 935 to calculate the remaining distance Dend. The PMECU 70 then proceeds to Step 940. In Step 940, the PMECU 70 makes the determination "No", and proceeds to Step 970 to make the determination "No". The PMECU 70 then directly proceeds to Step 995 to finish this routine.

When the vehicle 10 passes the end point De of the congestion control during the execution of the congestion control, and the PMECU 70 starts the processing from Step 900 again, in Step 905, the PMECU 70 makes the determination "Yes", and directly proceeds to Step 935 to calculate the remaining distance Dend. The PMECU 70 then proceeds to Step 940.

Then, in Step 940, the PMECU 70 makes the determination "No", and proceeds to Step 970. The value of the remaining distance Dend calculated in Step 935 is less than "0". Thus, in Step 970, the PMECU 70 makes a determination "Yes", and proceeds to Step 950 to determine whether or not the congestion control is being carried out. Currently, the congestion control is being carried out, and hence, in Step 950, the PMECU 70 makes a determination "Yes", and proceeds to Step 955 to finish the congestion control. In other words, as described above, the PMECU 70 changes the target state of charge SOCcntr from the second state of charge SOCcntr-j to the standard state of charge SOCcntr-n, thereby causing the actual SOC to approach the standard state of charge SOCcntr-n. Subsequently, the PMECU 70 proceeds to Step 960 to determine whether or not the congestion control inhibition distance Dph2 is equal to or less than "0".

The value of the congestion control inhibition distance Dph2 is set to "0" when the congestion control is started. Thus, in Step 960, the PMECU 70 makes a determination "Yes", and proceeds to Step 965 to permit the congestion control. The PMECU 70 then proceeds to Step 995 to finish this routine. As a result, the congestion control is carried out when the congestion control execution condition is satisfied in next and later executions of the routine.

(2) When Vehicle Travels on "Unexpected Downhill" (Forced Discharge is Carried Out)

When the vehicle 10 is traveling before the congestion control subject section (e.g., the point D1 of FIG. 4), and the PMECU 70 starts the processing from Step 900, in Step 905, the PMECU 70 makes the determination "No", and proceeds to Step 910. Then, in Step 910, the PMECU 70 makes the determination "No", and proceeds to Step 915 to acquire the foreseeing information.

Then, the PMECU 70 proceeds to Step 920. Currently, the vehicle 10 has not reached the start point Ds of the congestion control. Thus, in Step 920, the PMECU 70 makes the determination "No", and directly proceeds to Step 995 to finish this routine.

When the vehicle 10 reaches the start point Ds of the congestion control, the congestion control execution condition is satisfied. On this occasion, when the PMECU 70 starts the processing from Step 900 again, in Step 920, the PMECU 70 makes a determination "Yes", and proceeds to Step 925 to carry out the congestion control. Then, the PMECU 70 proceeds to Step 930 to set the value of the congestion control inhibition distance Dph2 to "0". The PMECU 70 then proceeds to Step 935 to calculate the remaining distance Dend.

Then, the PMECU 70 proceeds to Step 940. On this occasion, the value of the forced discharge flag XFDCH is "0". Thus, in Step 940, the PMECU 70 makes the determination "No", and proceeds to Step 970. Currently, the remaining distance Dend is more than "0". Thus, in Step 970, the PMECU 70 makes the determination "No", and directly proceeds to Step 995 to finish this routine.

When the vehicle 10 is traveling on an unexpected downhill and reaches, for example, the point D5 of FIG. 4, and the PMECU 70 starts the processing from Step 900 again, in Step 905, the PMECU 70 makes the determination "Yes", and directly proceeds to Step 935 to calculate the remaining distance Dend. The PMECU 70 then proceeds to Step 940. As illustrated in FIG. 4, the value of the forced discharge flag XFDCH is changed from "0" to "1" at the point D5. Thus, in Step 940, the PMECU 70 makes a determination "Yes", and proceeds to Step 945 to set the congestion control inhibition distance Dph2 to the remaining distance Dend. The PMECU 70 then proceeds to Step 950.

Currently, the congestion control is being carried out. Thus, in Step 950, the PMECU 70 makes the determination "Yes", and proceeds to Step 955 to finish the congestion control. The PMECU 70 then proceeds to Step 960. Currently, the congestion control inhibition distance Dph2 is a positive value. Thus, in Step 960, the PMECU 70 makes a determination "No", and proceeds to Step 975 to inhibit the congestion control. The PMECU 70 then proceeds to Step 980. In Step 980, the PMECU 70 stores the congestion control inhibition distance Dph2 (remaining distance Dend in this case) in the RAM, and proceeds to Step 995 to finish this routine.

When the vehicle 10 is traveling in the pre-charge control section (e.g., the point D6 of FIG. 4) while the congestion control is inhibited, and the PMECU 70 starts the processing from Step 900, in Step 905, the PMECU 70 makes the determination "No", and proceeds to Step 910. Then, in Step 910, the PMECU 70 makes a determination "Yes", and directly proceeds to Step 935 to calculate the remaining distance Dend. The PMECU 70 then proceeds to Step 940. On this occasion, the value of the forced discharge flag XFDCH is "0". Thus, in Step 940, the PMECU 70 makes the determination "Yes", and proceeds to Step 945 to set the congestion control inhibition distance Dph2 to the remaining distance Dend. The PMECU 70 then proceeds to Step 950.

On this occasion, the congestion control is not being carried out, and the congestion inhibition distance Dph2 is thus a positive value. Thus, in Step 950, the PMECU 70 makes a determination "No", and directly proceeds to Step 960 to make the determination "No" in Step 960. The PMECU 70 then proceeds to Step 975 to maintain the state of the congestion control inhibition. Then, the PMECU 70 proceeds to Step 980 to update the value of the congestion control inhibition distance Dph2 stored in the RAM. The PMECU 70 then proceeds to Step 995 to finish this routine. Subsequently, during the travel of the vehicle 10 in the subject congested section (the point Dk to the point De of FIG. 4), the state of the congestion control inhibition is similarly maintained.

When the vehicle 10 passes the end point De of the congestion control under the state where the congestion control is inhibited, and the PMECU 70 starts the processing from Step 900 again, in Step 905, the PMECU 70 makes the determination "No", and proceeds to Step 910 to make the determination "Yes" in Step 910. The PMECU 70 then directly proceeds to Step 935 to calculate the remaining distance Dend. Then, the PMECU 70 proceeds to Step 940 to make the determination "Yes", and proceeds to Step 945 to set the congestion control inhibition distance Dph2 to the current remaining distance Dend (in this case "0"). The PMECU 70 then proceeds to Step 950. Currently, the congestion control is not being carried out. Thus, in Step 950, the PMECU 70 makes the determination "No", and directly proceeds to Step 960.

On this occasion, the value of the congestion control inhibition distance Dph2 is "0". Thus, in Step 960, the PMECU 70 makes the determination "Yes", and proceeds to Step 965 to permit the congestion control. The PMECU 70 then proceeds to Step 995 to finish this routine. As a result, the congestion control is carried out when the congestion control execution condition is satisfied in next and later executions of the routine.

<Vehicle Travel Control>

Figure 10:
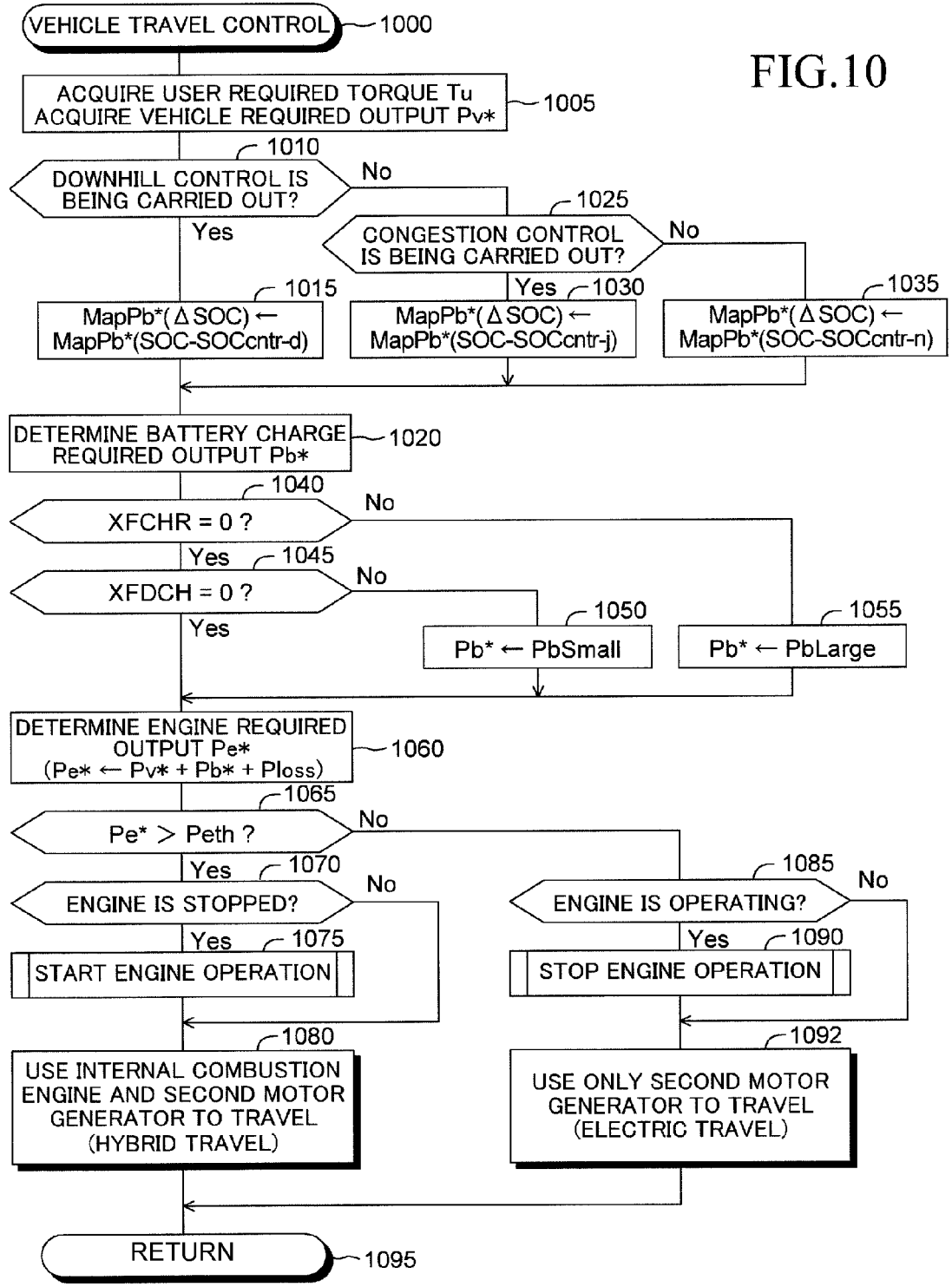
FIG. 10 is a flowchart for illustrating a "vehicle travel control routine" executed by the CPU of the PMECU of the hybrid vehicle illustrated in FIG. 1.

The PMECU 70 (actually, the CPU thereof) is configured to execute a vehicle travel control routine illustrated as a flowchart of FIG. 10 each time a sufficiently short certain period (e.g., 8 milliseconds) has elapsed. Thus, the PMECU 70 starts processing from Step 1000 at a predetermined timing, and proceeds to Step 1005 to acquire a user required torque Tu based on the accelerator operation amount AP and the vehicle speed SPD, and acquire a vehicle required output Pv* (user required output Pu*) by multiplying the vehicle speed SPD by the user required torque Tu.

Then, the PMECU 70 proceeds to Step 1010 to determine whether or not the downhill control is being carried out. When the downhill control is not being carried out by the downhill control routine illustrated in FIG. 8, in Step 1010, the PMECU 70 makes a determination "No", and proceeds to Step 1025 to determine whether or not the congestion control is being carried out. When the congestion control is not being carried out by the congestion control routine illustrated in FIG. 9, in Step 1025, the PMECU 70 makes a determination "No", and proceeds to Step 1035 to set a lookup table MapPb*(SOC-SOCcntr-n) for defining a relationship between a battery charge required output Pb* to be described later and a difference between the state of charge SOC and the standard state of charge SOCcntr-n as a lookup table MapPb*($\Delta$SOC) for determining the battery charge required output Pb*. $\Delta$SOC represents the difference between the state of charge SOC and the target state of charge SOCcntr (SOC-SOCcntr).

Figure 11:
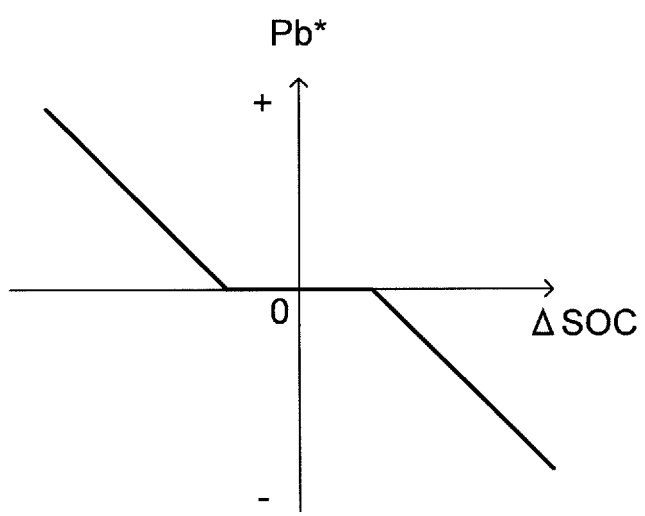
FIG. 11 is a lookup table to be referred to by the power management ECU (PMECU) of the hybrid vehicle illustrated in FIG. 1.

As shown in FIG. 11, with this table, when the difference $\Delta$SOC between the state of charge SOC and the target state of charge SOCcntr is a positive value, the battery charge required output Pb* is a negative value, and the absolute value of the battery charge required output Pb* is determined so as to increase as the absolute value of the difference $\Delta$SOC increases. On the other hand, when the difference $\Delta$SOC is a negative value, the battery charge required output Pb* is a positive value, and the absolute value of the battery charge required output Pb* is determined to increase as the absolute value of the difference $\Delta$SOC increases.

On the other hand, when the downhill control is being carried out, in Step 1010, the PMECU 70 makes a determination "Yes", and proceeds to Step 1015 to set the lookup table MapPb*(SOC-SOCcntr-d) as the lookup table MapPb*($\Delta$SOC) for determining the battery charge required output Pb*.

Alternatively, when the congestion control is being carried out, the PMECU 70 makes a determination "No" in Step 1010 and makes a determination "Yes" in Step 1025. The PMECU 70 then proceeds to Step 1030 to set the lookup table MapPb*(SOC-SOCcntr-j) as the lookup table MapPb*($\Delta$SOC) for determining the battery charge required output Pb*.

Figure 12:
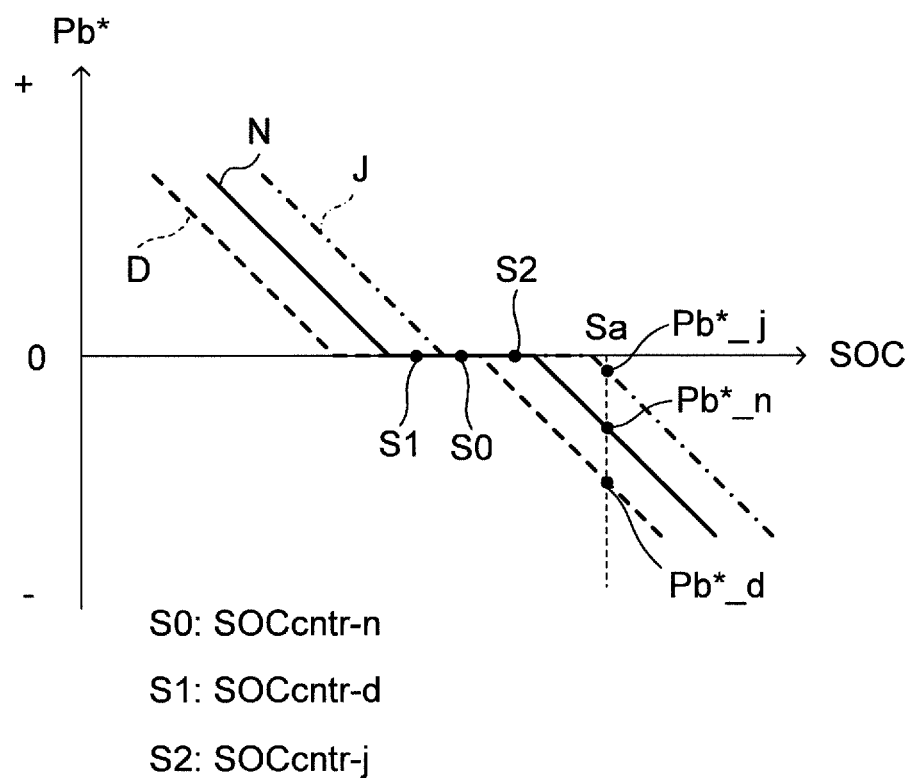
FIG. 12 is a graph for showing a relationship among three lookup tables to be referred to by the power management ECU (PMECU) of the hybrid vehicle illustrated in FIG. 1.

A relationship among the above-mentioned three lookup tables is shown in FIG. 12. The horizontal axis of FIG. 12 represents the state of charge SOC, and the vertical axis thereof represents the battery charge required output Pb*. A solid line N corresponds to the table MapPb*(SOC-SOCcntr-n) referred to during the normal state, a broken line D corresponds to the table MapPb*(SOC-SOCcntr-d) referred to during the downhill control, and a long dashed short dashed line J corresponds to a table MapPb*(SOC-SOCcntr-j) referred to during the congestion control. A point S0, a point S1, and a point S2 respectively denote the standard state of charge SOCcntr-n, the first state of charge (low state of charge) SOCcntr-d, and the second state of charge (high state of charge) SOCcntr-j. As described above, the first state of charge SOCcntr-k is less than the standard state of charge SOCcntr-n, and the second state of charge SOCcntr-j is more than the standard state of charge SOCcntr-n. Thus, the point S0, the point S1, and the point S2 on the horizontal axis are arranged in a sequence of the point S1, the point S0, and the point S2 from the left.

For example, when the state of charge SOC is at a point Sa more than the point S0, the point S1, and the point S2, a battery charge required output Pb*_d during the downhill control is less than a battery charge required output Pb*_n during the normal state. Thus, an engine required output Pe* decreases during the downhill control compared with the normal state. In contrast, a battery charge required output Pb*_j during the congestion control is more than the battery charge required output Pb*_n during the normal state. Thus, the engine required output Pe* increases during the congestion control compared with the normal state.

Then, the PMECU 70 proceeds to Step 1020 to determine the battery charge required output Pb* based on the state of charge SOC and the lookup table MapPb*(LSOC) set in any one of Step 1015, Step 1030, and Step 1035.

Then, the PMECU 70 proceeds to Step 1040 to determine whether or not the value of the forced charge flag XFCHR is "0". When the value of the forced charge flag XFCHR is "0", in Step 1040, the PMECU 70 makes a determination "Yes", and proceeds to Step 1045 to determine whether or not the value of the forced discharge flag XFDCH is "0". When the value of the forced discharge flag XFDCH is "0", in Step 1045, the PMECU 70 makes a determination "Yes", and directly proceeds to Step 1060.

In contrast, when the value of the forced discharge flag XFDCH is "1", in Step 1045, the PMECU 70 makes a determination "No", and proceeds to Step 1050 to set a very small value PbSmall (a value less than an engine start threshold Peth described later) to the battery charge required output Pb*, and then proceeds to Step 1060.

Further, when the value of the forced charge flag XFCHR is "1", in Step 1040, the PMECU 70 makes a determination "No", and proceeds to Step 1055 to set a very large value PbLarge (a value more than the engine start threshold Peth described later) to the battery charge required output Pb*, and then proceeds to Step 1060.

In Step 1060, the PMECU 70 calculates a sum of the vehicle required output Pv*, the battery charge required output Pb*, and a loss (constant value) Ploss as the engine required output Pe*.

Then, the PMECU 70 proceeds to Step 1065 to determine whether or not the engine required output Pe* is more than the engine start threshold Peth. The engine start threshold Peth is set to a value for enabling the internal combustion engine 20 to operate at an operation efficiency more than a predetermined operation efficiency.

When the engine required output Pe* is more than the engine start threshold Peth, in Step 1065, the PMECU 70 makes a determination "Yes", and proceeds to Step 1070 to determine whether or not the engine is stopped (the operation of the internal combustion engine 20 is stopped). When the engine is stopped, in Step 1070, the PMECU 70 makes a determination "Yes", and proceeds to Step 1075 to start the internal combustion engine 20. The PMECU 70 then proceeds to Step 1080. In contrast, when the engine is not stopped, in Step 1070, the PMECU 70 makes a determination "No", and directly proceeds to Step 1080. Then, in Step 1080, the PMECU 70 controls the internal combustion engine 20 and the second motor generator MG2 (actually, further controls the first motor generator MG1) by a widely known method, and uses the output from both of the internal combustion engine 20 and the second motor generator MG2 to cause the vehicle 10 to travel. In other words, the vehicle 10 carries out the hybrid travel.

On the other hand, when the engine required output Pe* is equal to or less than the engine start threshold Peth, in Step 1065, the PMECU 70 makes a determination "No", and proceeds to Step 1085 to determine whether or not the engine is operating (the internal combustion engine 20 is operating). When the engine is operating, in Step 1085, the PMECU 70 makes a determination "Yes", and proceeds to Step 1090 to stop the internal combustion engine 20. The PMECU 70 then proceeds to Step 1092. In contrast, when the engine is not operating, in Step 1085, the PMECU 70 makes a determination "No", and directly proceeds to Step 1092. Then, in Step 1092, the PMECU 70 controls the second motor generator MG2 by a widely known method, and uses only the output from the second motor generator MG2 to cause the vehicle 10 to travel. In other words, the vehicle 10 carries out generator travel (the electric travel).

The driving force control is widely known, and is described in detail in, for example, Japanese Patent Application Laid-open No. 2009-126450 (US 2010/0241297), Japanese Patent Application Laid-open No. Hei 09-308012 (U.S. Pat. No. 6,131,680, US application date of which is Mar. 10, 1997), Japanese Patent Application Laid-open No. 2013-154720, Japanese Patent Application Laid-open No. 2013-154718, and Japanese Patent Application Laid-open No. 2013-154715.

<Regenerative Braking Control>

Further, the PMECU 70 is configured to execute a routine (not shown) to determine a required braking force required for the vehicle 10 based on the brake operation amount BP when the accelerator operation amount AP is "0". Then, the PMECU 70 distributes the required braking force to a required regenerative braking force and a required friction braking force, controls the second motor generator MG2 so that the required regenerative braking force is generated by the regenerative braking, and controls a hydraulic brake actuator (not shown) so that the required friction braking force is generated by friction brake devices (not shown). The PMECU 70 sets the required regenerative braking force to "0" when the state of charge SOC is more than the upper limit state of charge SOCuplmt (when a forced discharge start condition is satisfied), and carries out the braking only by using the friction braking force so that the regenerative energy is not stored in the storage battery 64.

As described above, the control device is configured to carry out pre-charge/discharge control (the downhill control or the congestion control) of changing, when the vehicle 10 travels in the control section (the downhill control section or the congestion control section), the target state of charge SOCcntr from the standard state of charge SOCcntr-n to the specific state of charge (the first state of charge SOCcntr-d or the second state of charge SOCcntr-j), which is different from the standard state of charge SOCcntr-n, and is within the permissible range (management range MGR), in the period (in this embodiment, the period until the vehicle 10 reaches the control section end point De) in which the vehicle 10 travels from the control start point Ds to at least the start point (Dk or Dj) of the subject section (the subject downhill section or the subject congested section). Further, the control device is configured to inhibit, when the return control (the forced charge or the forced discharge) is carried out while the pre-charge/discharge control is being carried out, the pre-charge/discharge control from the start time point D5 of the return control to the time point D9 (that is, the control section end point De) at which the vehicle 10 has passed through the control section.

Thus, with the control device, the forced charge is not repeated during the downhill control, and the forced discharge is not repeated during the congestion control. Thus, the occurrence in which the fuel is wasted decreases, and a fuel performance can thus be increased. The present invention is not limited to the above-mentioned embodiment, and various modified examples can be adopted within the scope of the present invention. In the following, such modified examples are enumerated.

(1) The forced charge may occur not only when the vehicle 10 is traveling on a congested road but also when the vehicle 10 is traveling on an uphill. Thus, the control device may be configured to predict whether or not an uphill section (hereinafter also referred to as "subject uphill section") exists in the planned travel route of the vehicle 10 based on the position information on the vehicle 10, the road information, and other such data. Then, when the control device extracts a subject uphill section from the planned travel route, the control device may increase, in advance, the state of charge SOC of the storage battery 64 so that the state of charge SOC does not reach the lower limit state of charge SOClolmt until the vehicle 10 has passed through the subject uphill section.

In this case, the NVECU 74 controls the state of charge SOC of the storage battery 64 so that the state of charge SOC is increased from the standard state of charge SOCcntr-n from a point where the vehicle 10 is located a predetermined third distance before the start point of the "extracted subject uphill section", and the state of charge SOC reaches a state of charge (third state of charge SOCcntr-u) more than the standard state of charge SOCcntr-n at the start point of the subject uphill section. The third state of charge SOCcntr-u is more than the standard state of charge SOCcntr-n (60% of the full charge) in the normal state, and less than the upper limit state of charge SOCuplmt (80% of the full charge), and is set, for example, to the same value (70% of the full charge) as the second state of charge SOCcntr-j. This control is hereinafter referred to as "uphill control". In other words, the uphill control is the pre-charge control similar to the congestion control. An operation of the uphill control is described in the same way as that of the congestion control.

In other words, the NVECU 74 carries out an "uphill search" together with the "downhill search" and the "congestion search" each time the predetermined period (in this example, 5 minutes, which is the time interval of the update of the VICS information), has elapsed. It is assumed that the vehicle 10 has reached the point D1 of FIG. 4 at the timing of the execution of the uphill search. At this time point, the vehicle 10 is in the normal travel state, and the NVECU 74 is thus not carrying out the uphill control. The description continues assuming that the two sections corresponding to the link #2 and the link #3 correspond to the subject uphill section in which the uphill control is carried out.

The NVECU 74 is configured to extract (identify) a subject uphill section that is a subject of the "uphill control" in the travel route during the "uphill search". Specifically, based on the information in the NVDB 86, the NVECU 74 identifies, as the "subject uphill section", a section corresponding to a link group (hereinafter referred to as "third link group") that is a single link or a plurality of successive links out of a link group that corresponds to the planned travel route, and satisfies all the following conditions. Those conditions are also referred to as "subject uphill section identification conditions" or "third predetermined conditions". The following conditions are only an example, and the present invention is not limited to the example.

(Subject Uphill Section Identification Conditions)

(a) The sections corresponding to the respective links of the third link group are within a certain distance (e.g., within a 10-kilometer radius) from the current position of the vehicle 10.

(b) Any one of the sections corresponding to the respective links of the third link group has an upward inclination more than a predetermined threshold inclination.

(c) The elevation Hs of the start point of the third link group is less than the elevation He of the end point of the third link group (Hs<He), and the absolute value of a difference (elevation difference $\Delta Ha = |Hs-He|$) is equal to or more than a predetermined elevation difference (SOC_STL_H).

(d) A total distance $\Delta Dc$ of the sections corresponding to the third link group is equal to or more than the predetermined distance (SOC_STL_D).

When the state of charge SOC becomes more than the upper limit state of charge SOCuplmt during the uphill control, the control device changes the value of the forced discharge flag XFDCH from "0" to "1", and carries out the forced discharge. Then, the control device inhibits the uphill control from the point at which the forced discharge is carried out to the end point of the uphill control section. In other words, when the forced discharge occurs in the uphill control section, the control device changes the target SOC from the third state of charge SOCcntr-u to the standard state of charge SOCcntr-n, and maintains the value to be the standard state of charge SOCcntr-n until the end point of the uphill control section.

In this way, similarly to the "downhill control" and the "congestion control", the "uphill control" is control of changing, when the vehicle 10 travels in the control section, the target state of charge SOCcntr from the standard state of charge SOCcntr-n to the specific state of charge, which is different from the standard state of charge SOCcntr-n, and is within the permissible range (management range MGR), in the period in which the vehicle 10 travels from the control start point to at least the start point of the subject section. Thus, the "uphill control" is also referred to as "pre-charge/discharge control".

Further, the actual operation of the uphill control can be described referring to the congestion control routine illustrated in FIG. 9. In this case, the "congestion control" in the flowchart can be replaced by "uphill control". As described above, when the vehicle 10 travels in the subject uphill section, the power in the storage battery 64 is consumed, and the state of charge SOC thus decreases. However, even when the vehicle 10 reaches the end point of the subject uphill section, the state of charge SOC does not reach the lower limit state of charge SOClolmt. As a result, the control device can avoid the execution of the forced charge, thereby preventing the degradation of the fuel efficiency.

(2) In the above-mentioned embodiment, the PMECU 70 is configured to carry out the "downhill control resumption inhibition control" when the state of charge SOC becomes less than the lower limit state of charge SOClolmt during the downhill control, and carry out the "congestion control resumption inhibition control" when the state of charge SOC becomes more than the upper limit state of charge SOCuplmt during the congestion control. The control is not limited to this mode, and the PMECU 70 may be configured to carry out only any one of the downhill control and the congestion control. In this case, when only the downhill control is carried out, only the "downhill control resumption inhibition control" may be carried out, and when only the congestion control is carried out, only the "congestion control resumption inhibition control" may be carried out.

(3) The PMECU 70 may be configured to carry out the downhill control only in the period after the vehicle 10 passes the control start point Ds and until the vehicle 10 reaches the start point Dk of the subject downhill section, namely, in the pre-use section. Similarly, the PMECU 70 may be configured to carry out the congestion control only in the period after the vehicle 10 passes the control start point Ds and until the vehicle 10 reaches the start point Dj of the subject congested section, namely, in the pre-charge section.

(4) The NVECU 74 may be configured to carry out the "downhill search" and the "congestion search" described referring to FIG. 3 and FIG. 4 each time the vehicle 10 has traveled a predetermined distance.

(5) The NVECU 70 may be configured to carry out a part or the entirety of the routines illustrated in FIG. 8 and/or FIG. 9. In this case, the PMECU 70 only needs to acquire necessary information from the NVECU 74.

What is claimed is:

1. A control device for a hybrid vehicle, which is applied to a hybrid vehicle in which an internal combustion engine serving as a drive source for the hybrid vehicle, a motor generator serving as a drive source for the hybrid vehicle, and a storage battery configured to supply power to the motor generator are installed, the hybrid vehicle being configured to carry out regenerative braking through use of the motor generator, and to be capable of charging the storage battery with power generated by the regenerative braking and capable of charging the storage battery with power generated by output of the internal combustion engine through use of the motor generator, the control device comprising a control part configured to control the internal combustion engine and the motor generator so that a state of charge of the storage battery satisfies a required driving force required for the hybrid vehicle and approaches a target state of charge set to a standard state of charge, wherein the control part is configured to:
 carry out, when the state of charge deviates from a permissible range of from a lower limit state of charge less than the standard state of charge to an upper limit state of charge more than the standard state of charge, return control of forcefully carrying out one of charge of the storage battery and discharge from the storage battery so that the state of charge returns to within the permissible range;
 acquire position information representing a position of the hybrid vehicle and road information;
 acquire a planned travel route of the hybrid vehicle based on the position information and the road information;
 extract a subject section within the planned travel route, which is at least one of a subject downhill section satisfying a first predetermined condition, a subject congested section satisfying a second predetermined condition, or a subject uphill section satisfying a third predetermined condition, based on road information on a road section forming the planned travel route, which is the road information;
 determine, when the subject section is included in the planned travel route, a control section, which is a section from a control start point a predetermined distance before a start point of the subject section to an end point of the subject section;
 carry out, when the hybrid vehicle travels in the control section, pre-charge/discharge control of changing the target state of charge from the standard state of charge to a specific state of charge, which is different from the standard state of charge and is within the permissible range, in a period in which the hybrid vehicle travels from the control start point to at least the start point of the subject section; and
 inhibit, when the return control is carried out while the pre-charge/discharge control is being carried out, the pre-charge/discharge control from a start time point of the return control to a time point at which the hybrid vehicle has passed through the control section.

2. A control device for a hybrid vehicle according to claim 1, wherein the control part is configured to:
 extract the subject downhill section as the subject section; and
 set the specific state of charge to a first state of charge less than the standard state of charge and more than the lower limit state of charge.

3. A control device for a hybrid vehicle according to claim 1, wherein the control part is configured to:
 extract the subject congested section as the subject section; and
 set the specific state of charge to a second state of charge more than the standard state of charge and less than the upper limit state of charge.

4. A control device for a hybrid vehicle according to claim 1, wherein the control part is configured to:
 extract the subject uphill section as the subject section; and
 set the specific state of charge to a third state of charge more than the standard state of charge and less than the upper limit state of charge.

* * * * *